United States Patent
Miyazawa

(10) Patent No.: US 6,266,296 B1
(45) Date of Patent: Jul. 24, 2001

(54) ACTUATOR, AND TIMEPIECE AND NOTIFICATION DEVICE USING THE SAME

(75) Inventor: Osamu Miyazawa, Shimosuwa-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/269,806

(22) PCT Filed: Aug. 3, 1998

(86) PCT No.: PCT/JP98/03464

§ 371 Date: Jun. 3, 1999

§ 102(e) Date: Jun. 3, 1999

(87) PCT Pub. No.: WO99/07063

PCT Pub. Date: Feb. 11, 1999

(30) Foreign Application Priority Data

Aug. 4, 1997 (JP) .................................... 9-209470
Mar. 27, 1998 (JP) .................................. 10-082254

(51) Int. Cl.[7] ............................. G04B 19/24; G04F 5/00; G04C 21/16; H01L 1/48
(52) U.S. Cl. ............................. 368/28; 368/157; 368/255; 310/323.01; 310/323.03
(58) Field of Search ............................. 368/28, 29, 157, 368/160, 255; 310/323.01–323.06, 528

(56) References Cited

U.S. PATENT DOCUMENTS

| 5,296,776 | * | 3/1994 | Wind et al. ............................. 310/323 |
| 5,719,461 | * | 2/1998 | Peclat et al. ............................ 310/323 |
| 5,955,820 | * | 9/1999 | Uchino et al. ...................... 310/323.04 |

FOREIGN PATENT DOCUMENTS

| 59-37672 | 9/1984 | (JP) . |
| 59-194678 | 11/1984 | (JP) . |
| 10-225151 | 8/1998 | (JP) . |

* cited by examiner

*Primary Examiner*—Vit Miska

(57) ABSTRACT

To provide an actuator which can achieve a reduction in size and weight of a device in which the actuator is mounted by amplifying and outputting displacement of a movable end of a vibrating plate as vibration in an in-plane direction, and to provide a timepiece and a notification device using the same, in an actuator (10), when a voltage is applied to a piezoelectric element (21) formed on a vibrating plate (12), the vibrating plate (12) generates bending vibrations in an out-of-plane direction, and one end portion (125) repeats displacement in an in-plane direction as a movable end. The displacement is transmitted to a lever (32) whose base end side (321) is connected to the end portion (125) of the vibrating plate (12) and an elastically deformable constricted portion (31), and a free end (322) of the lever (32) vibrates in the in-plane direction to drive a follower member (500).

40 Claims, 17 Drawing Sheets

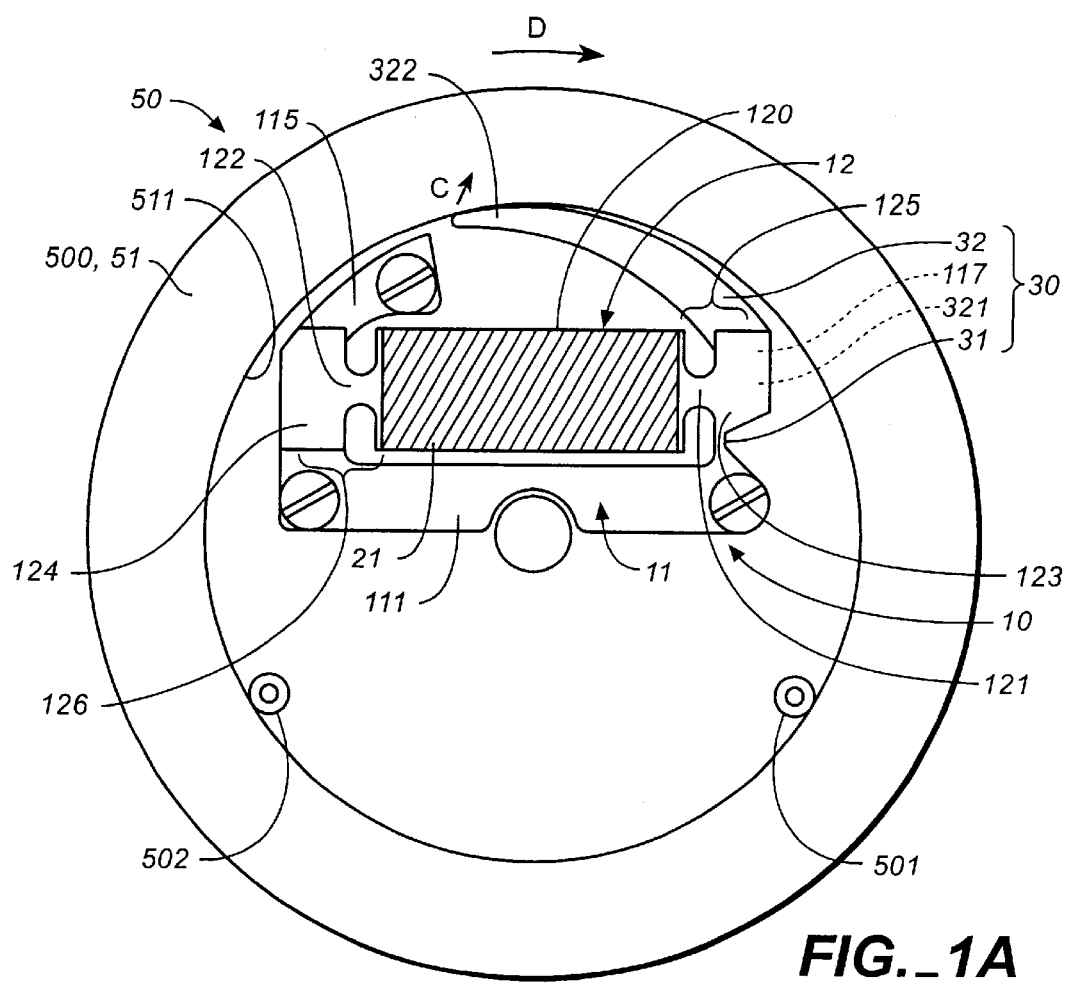
FIG._1A
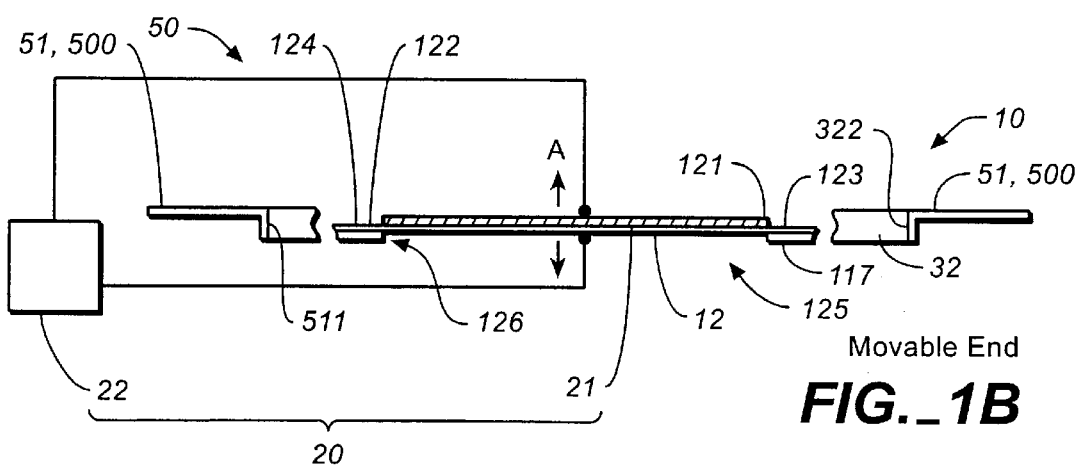
FIG._1B

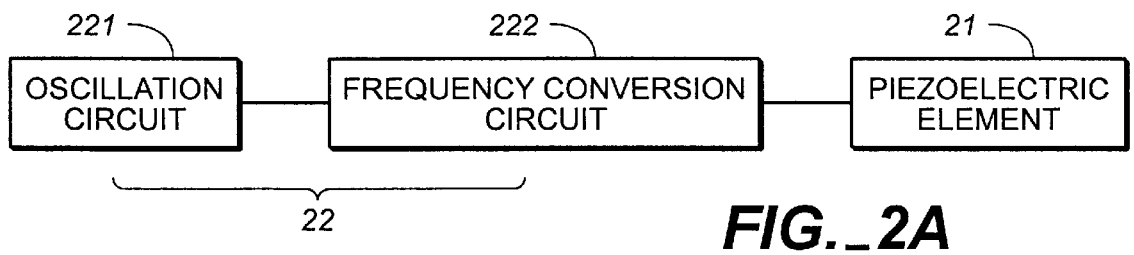
FIG._2A
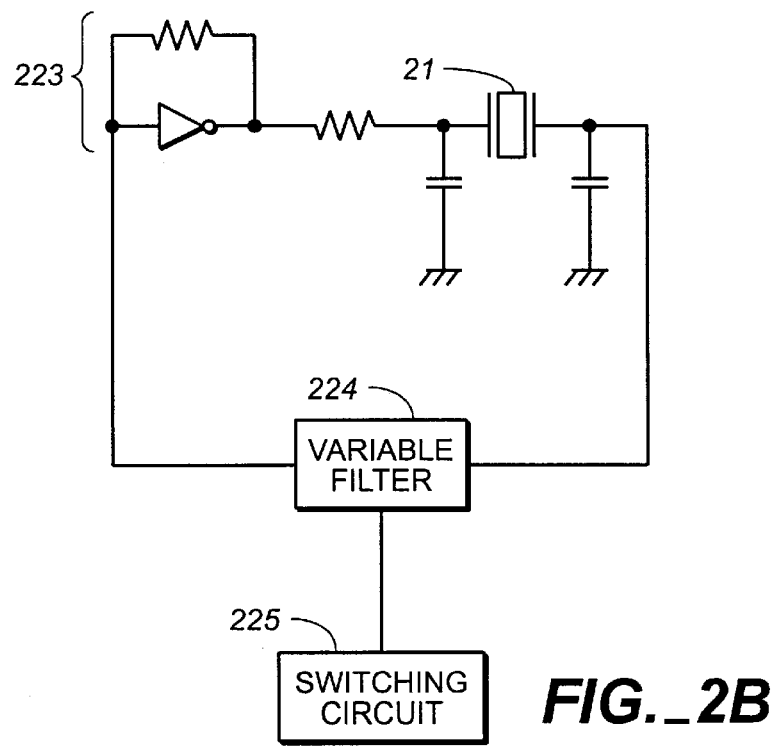
FIG._2B

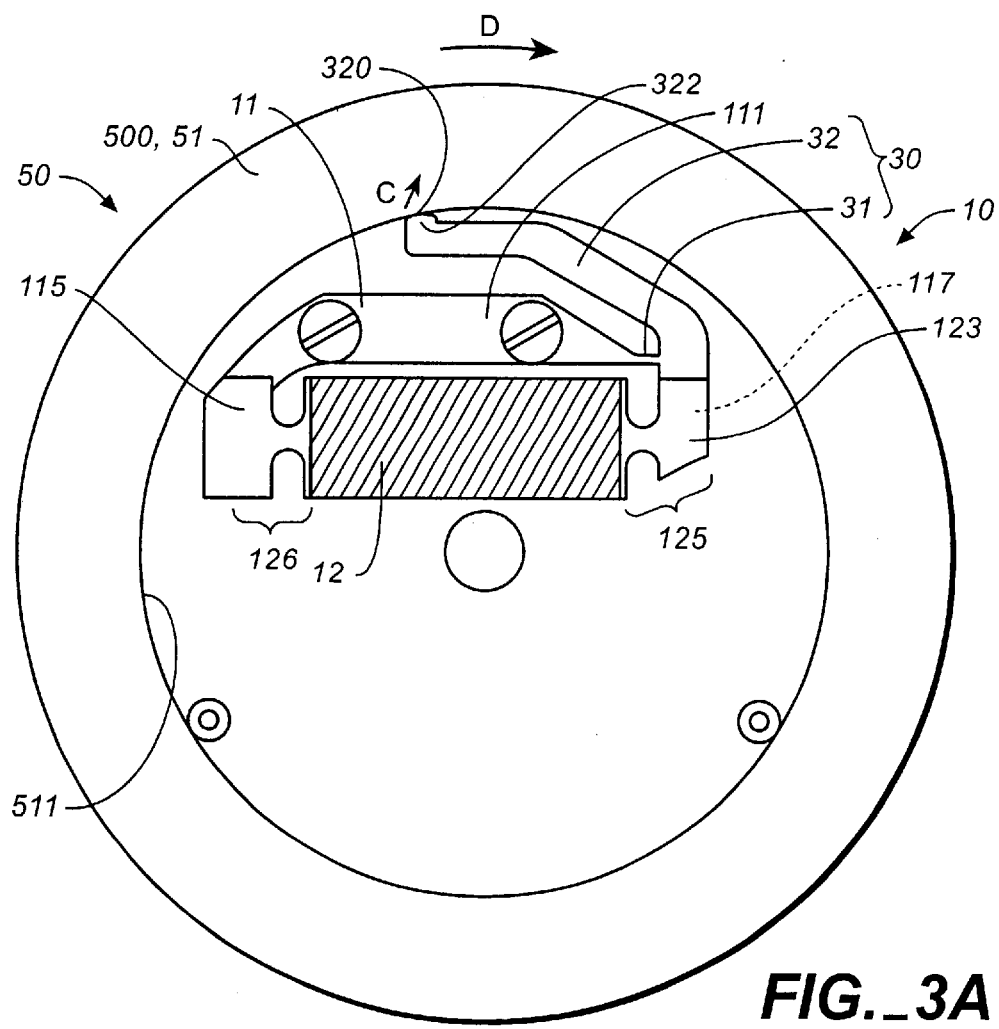
FIG._3A
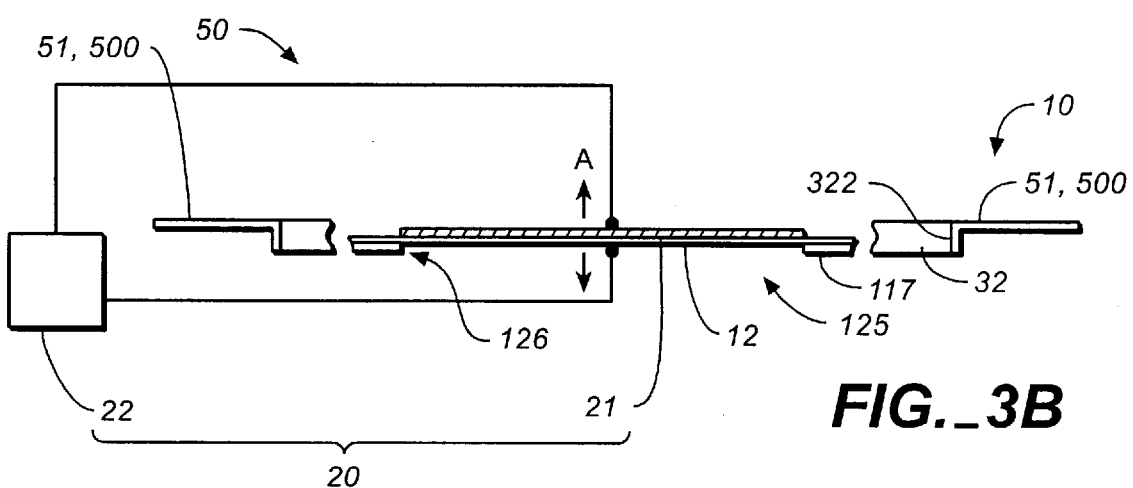
FIG._3B

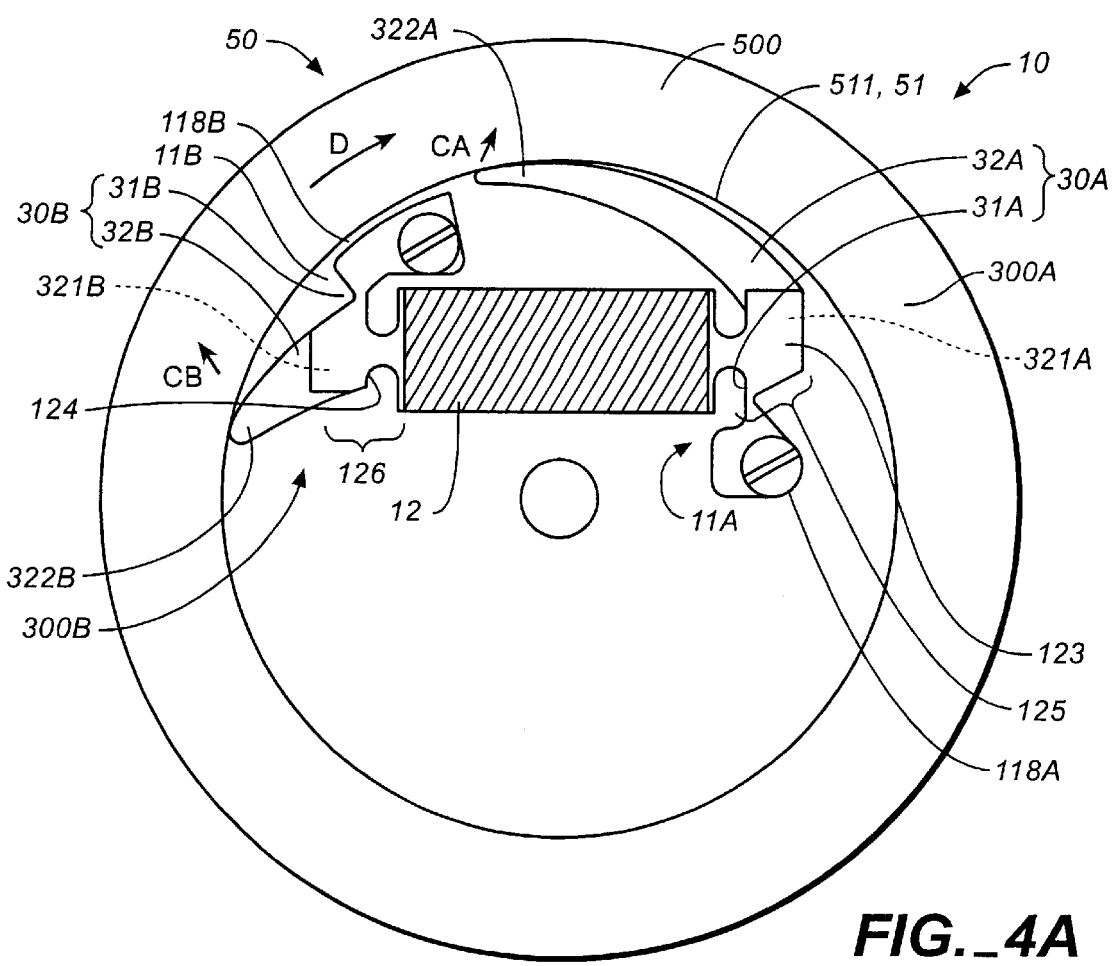
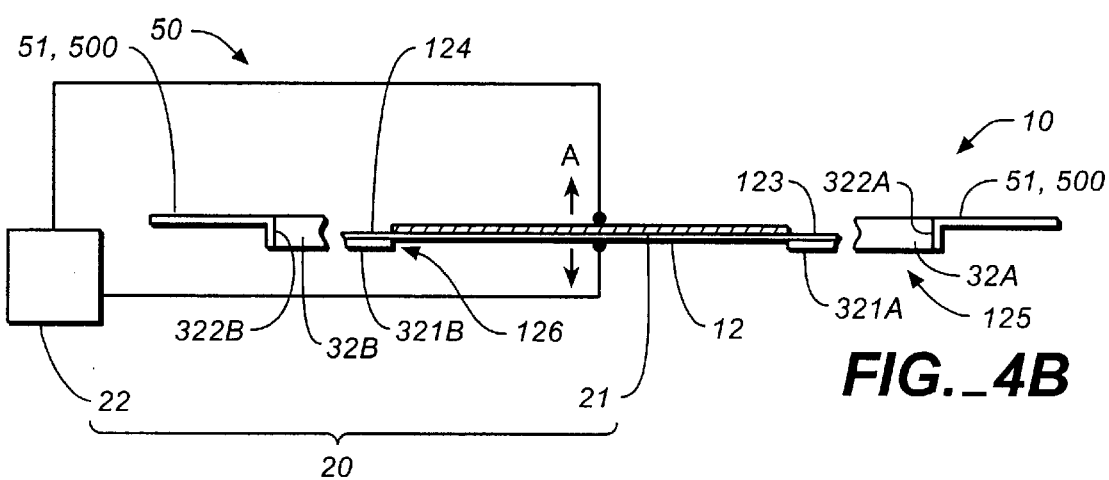
FIG._4A
FIG._4B

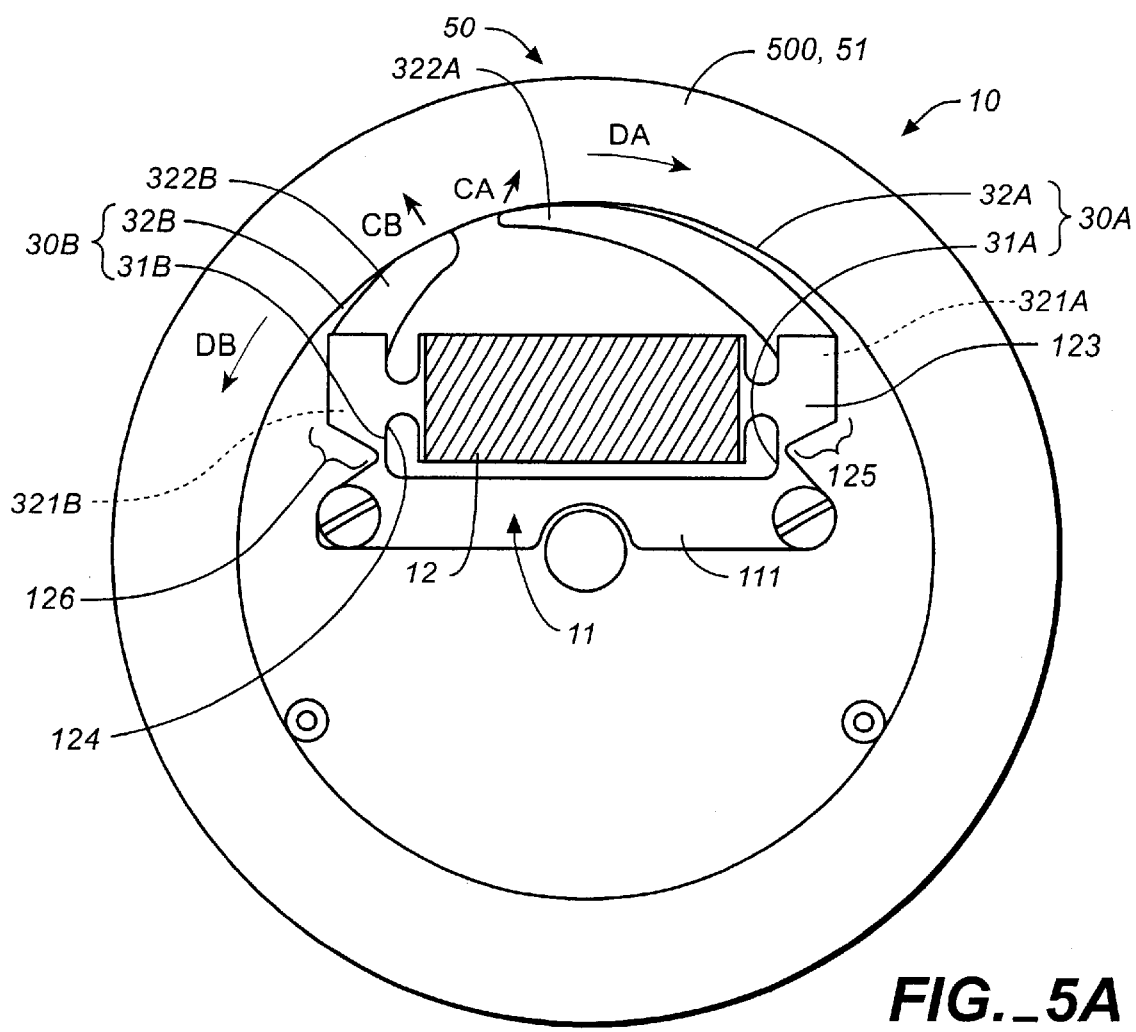
FIG._5A
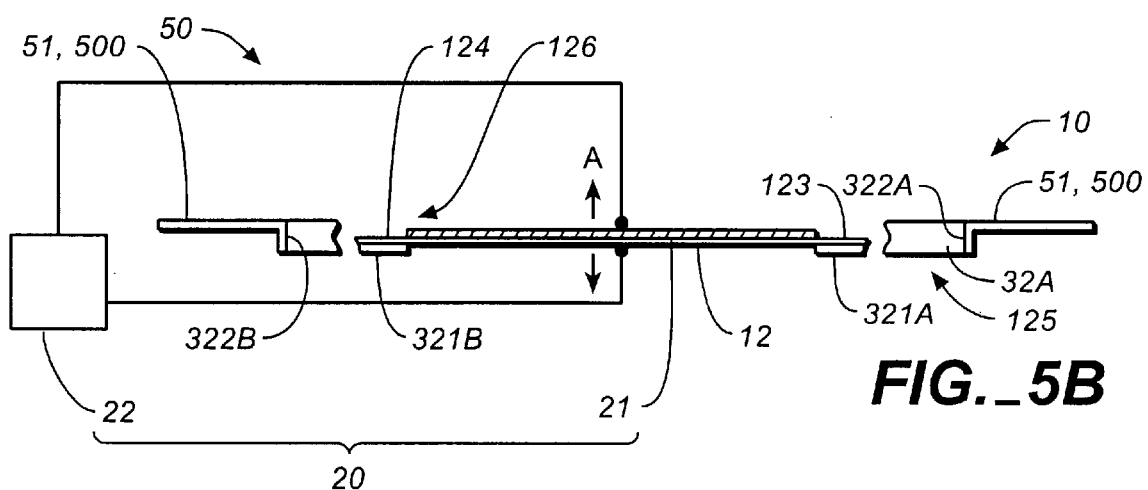
FIG._5B

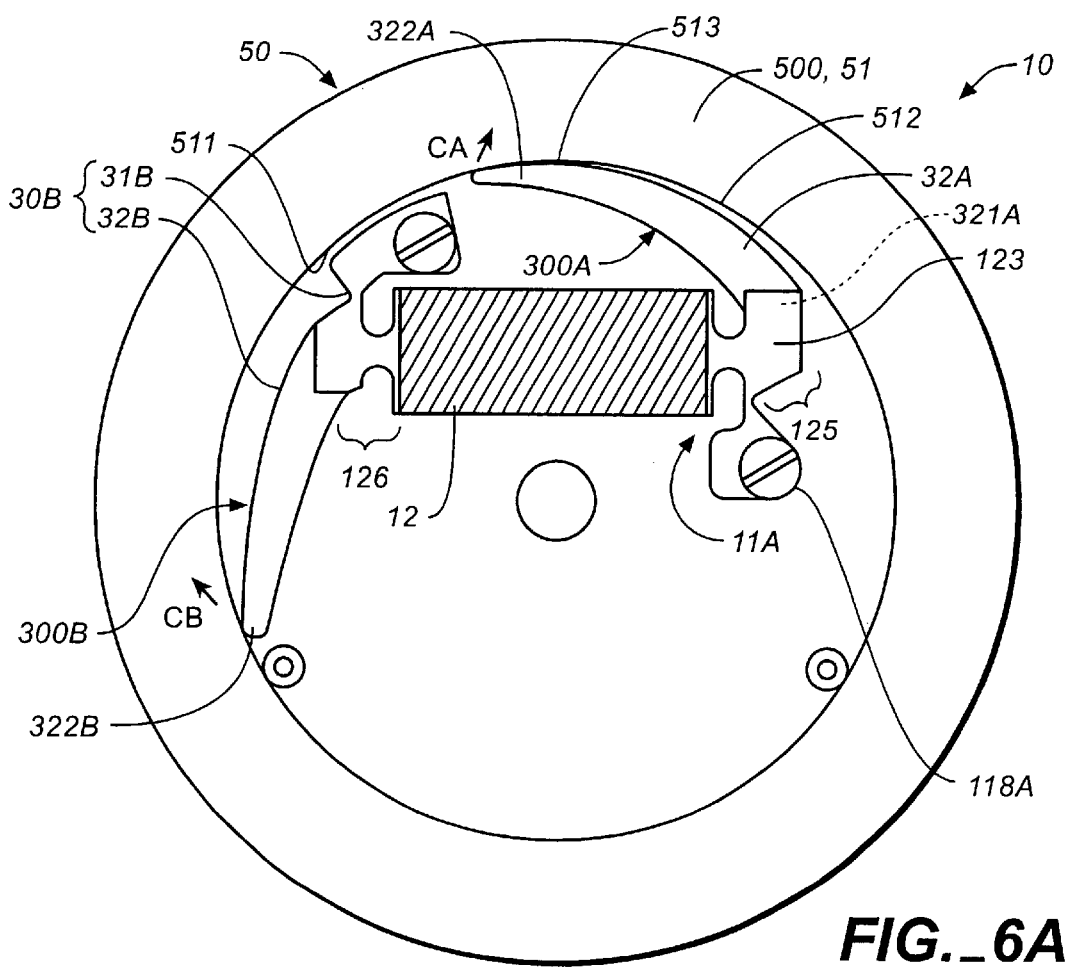
FIG._6A
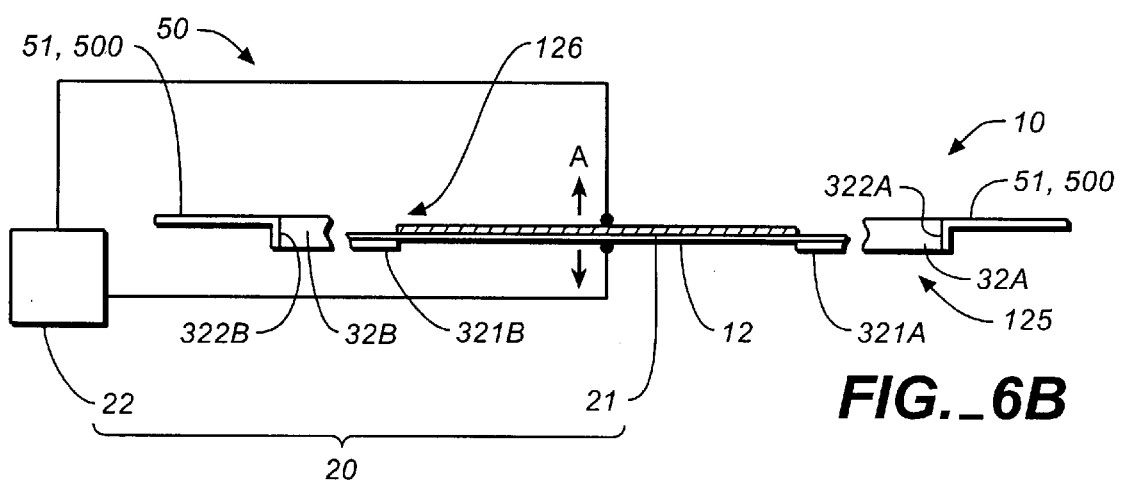
FIG._6B

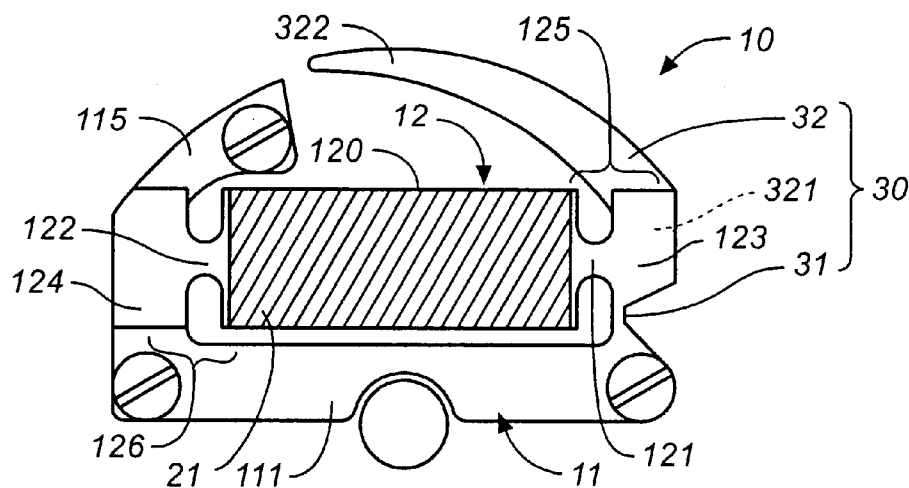
FIG._7A
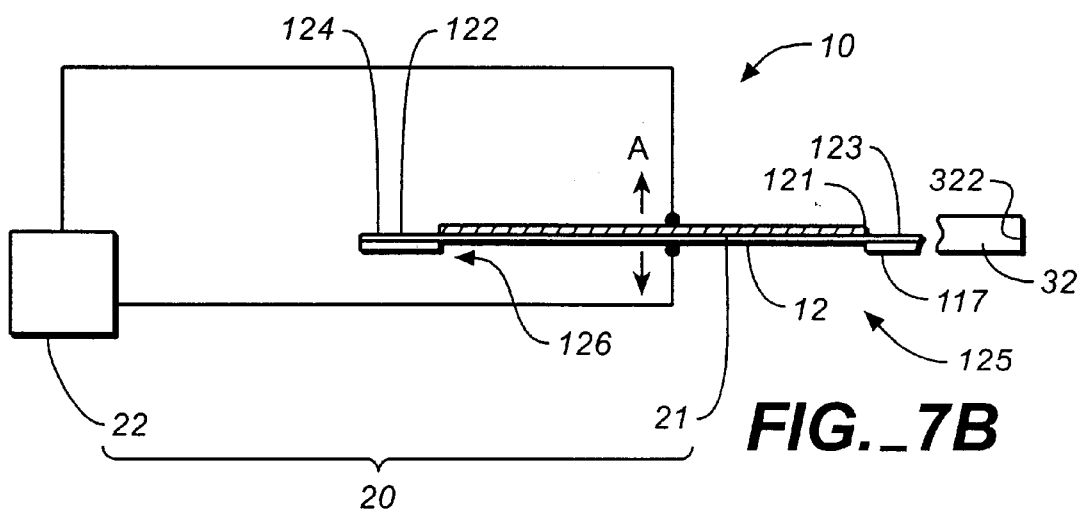
FIG._7B

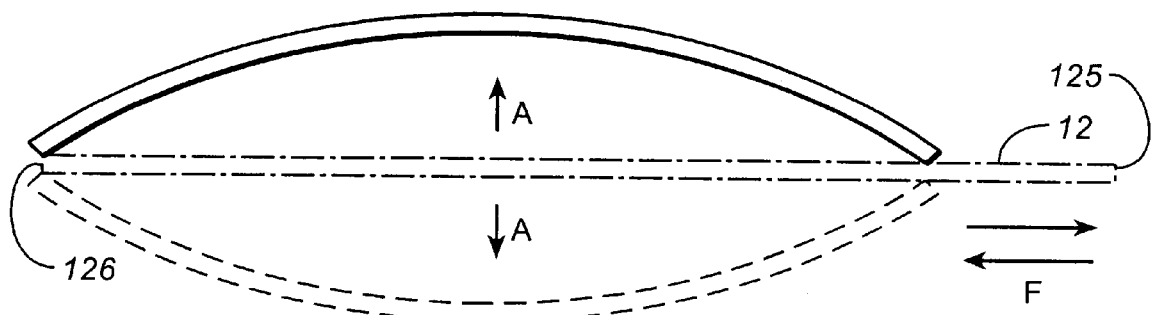
FIG._8A
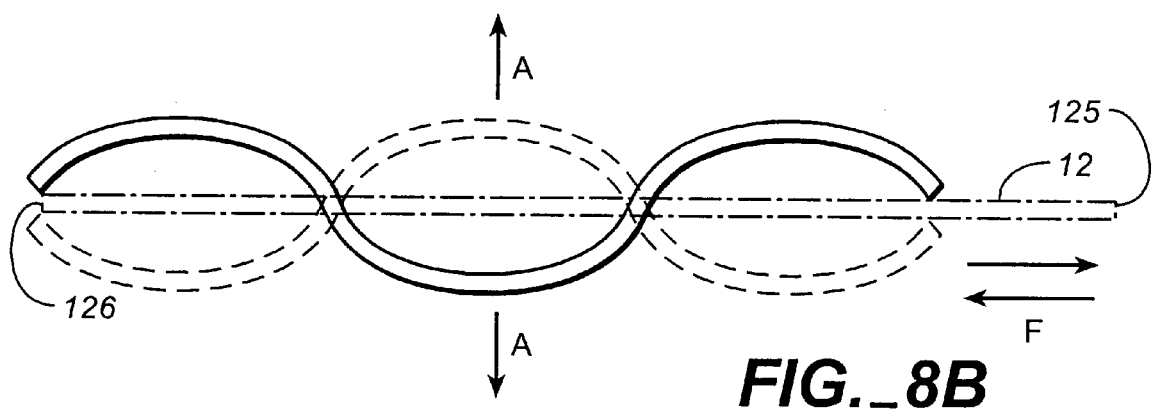
FIG._8B

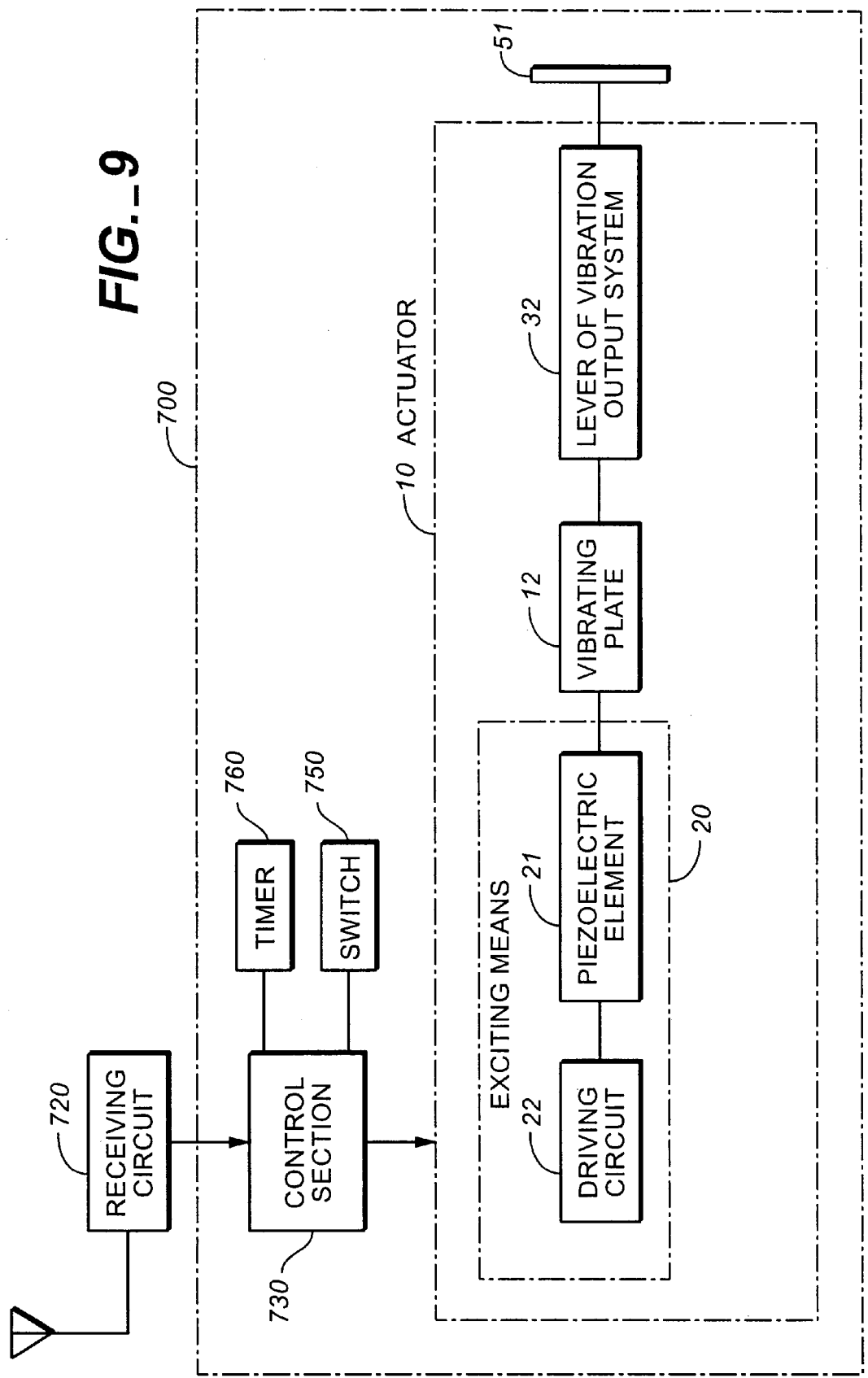

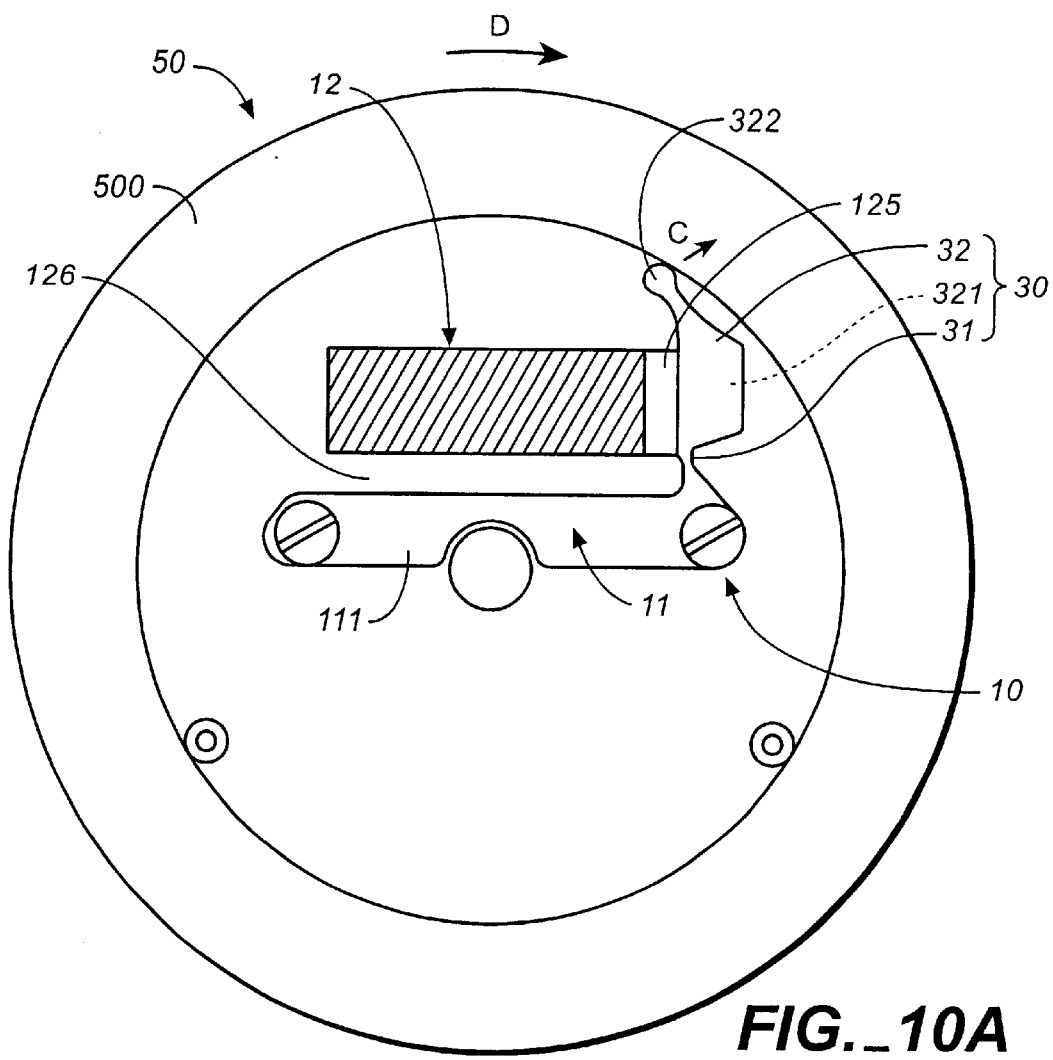
FIG._10A
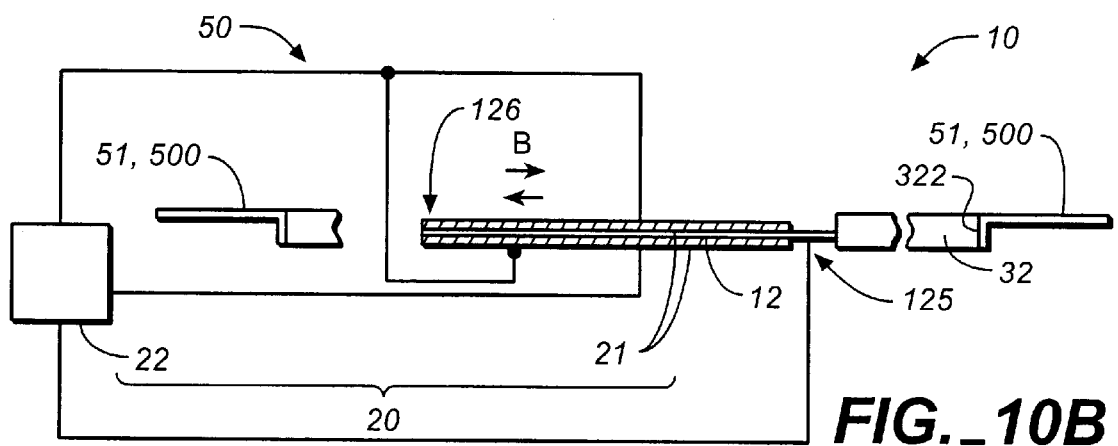
FIG._10B

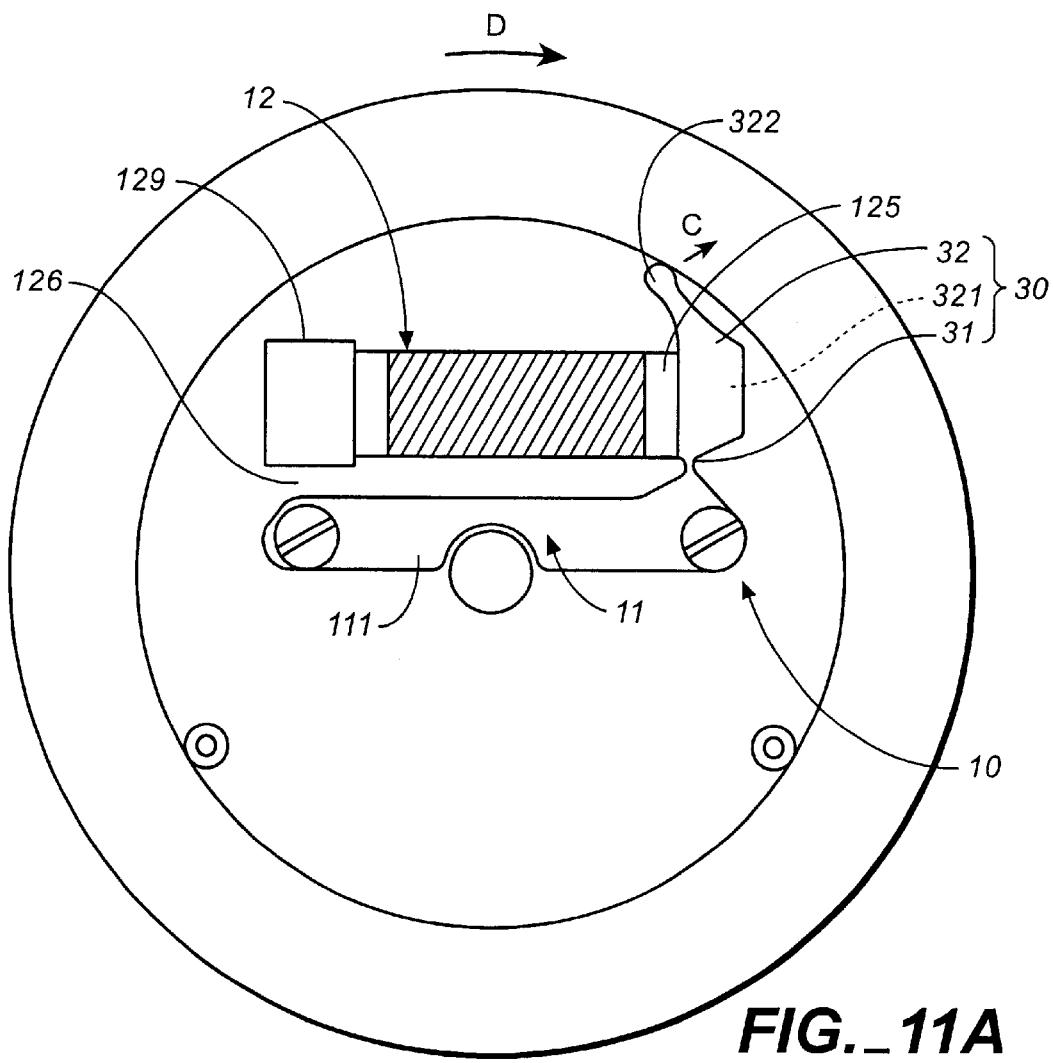
FIG._11A
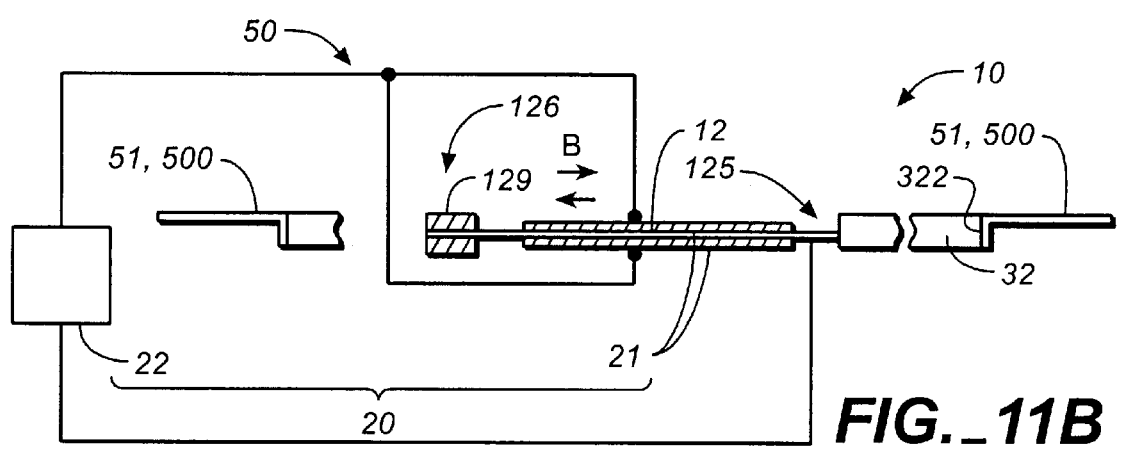
FIG._11B

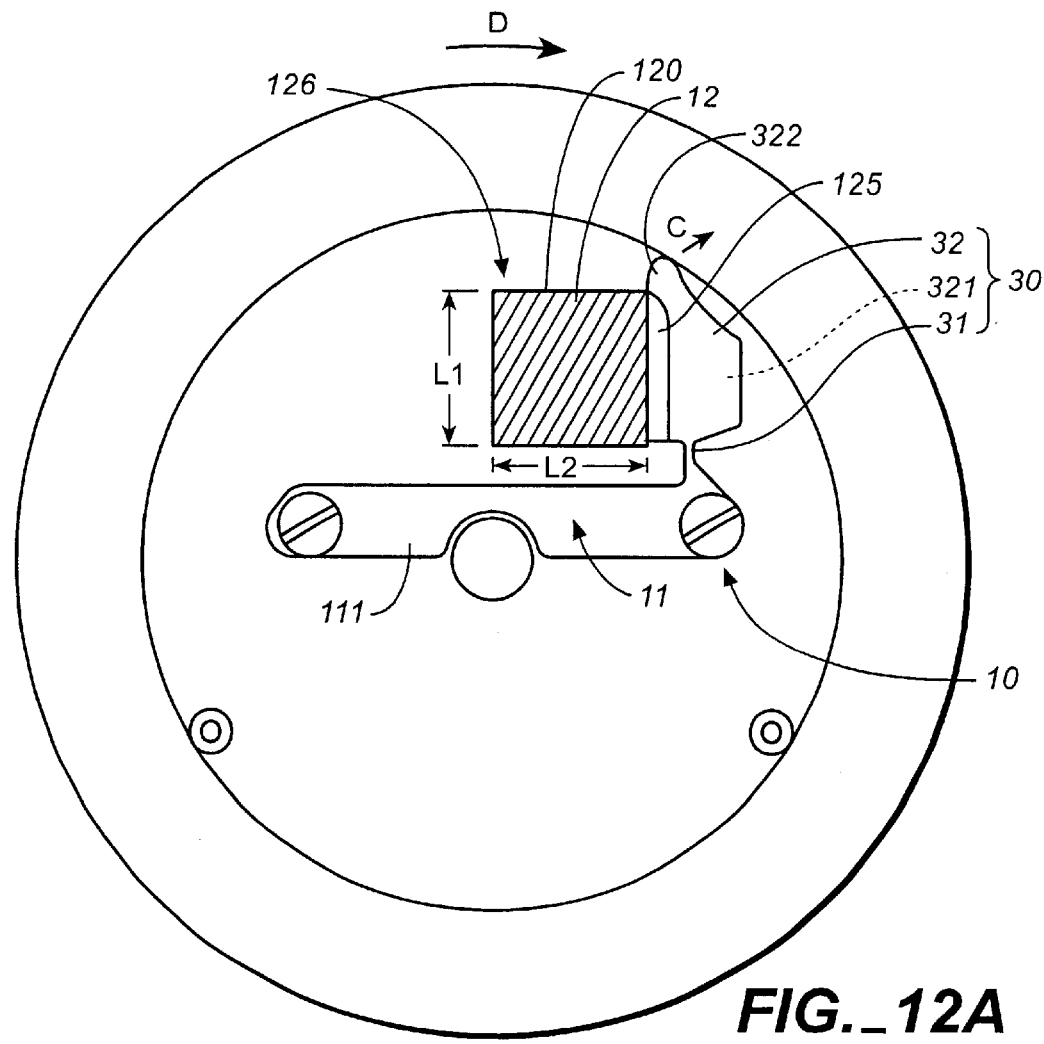
FIG._12A
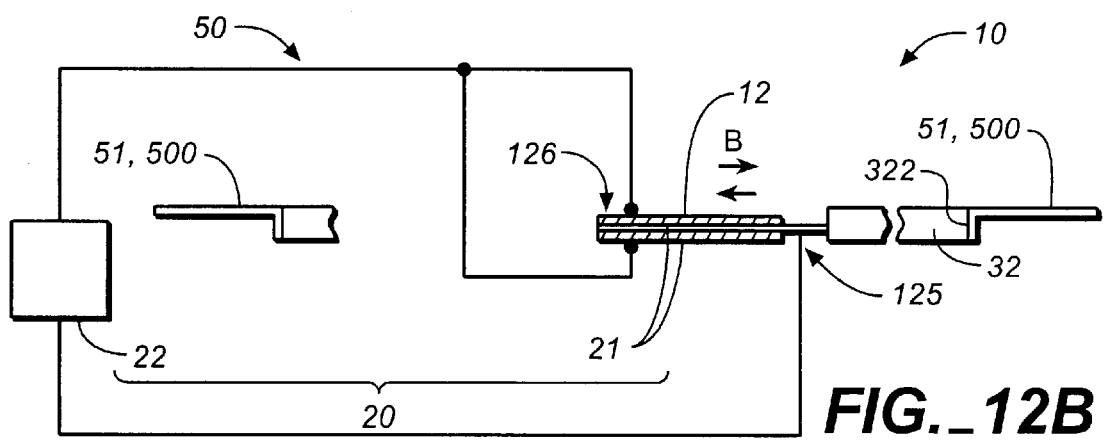
FIG._12B

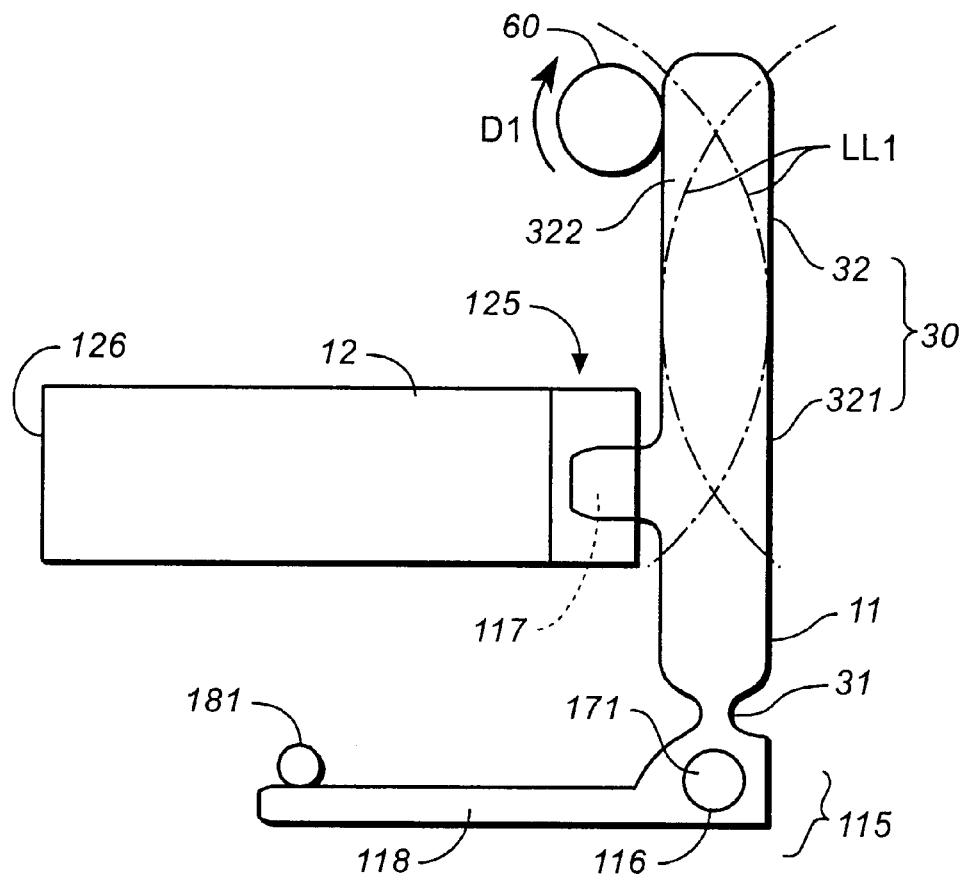
FIG._13A
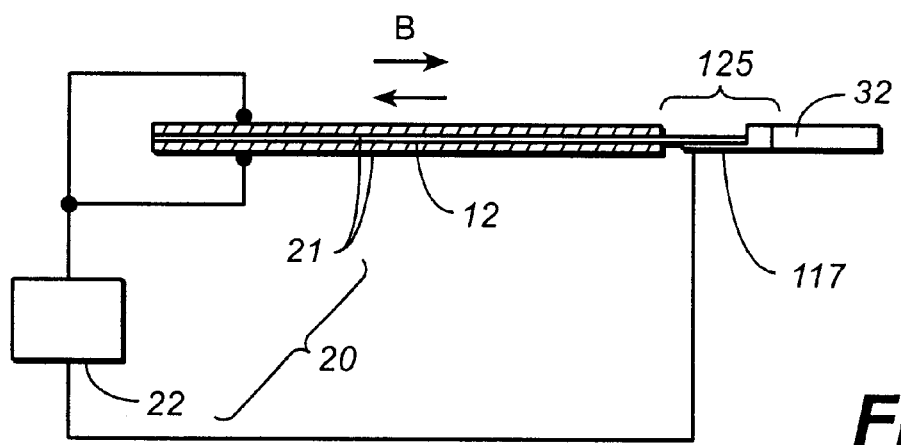
FIG._13B

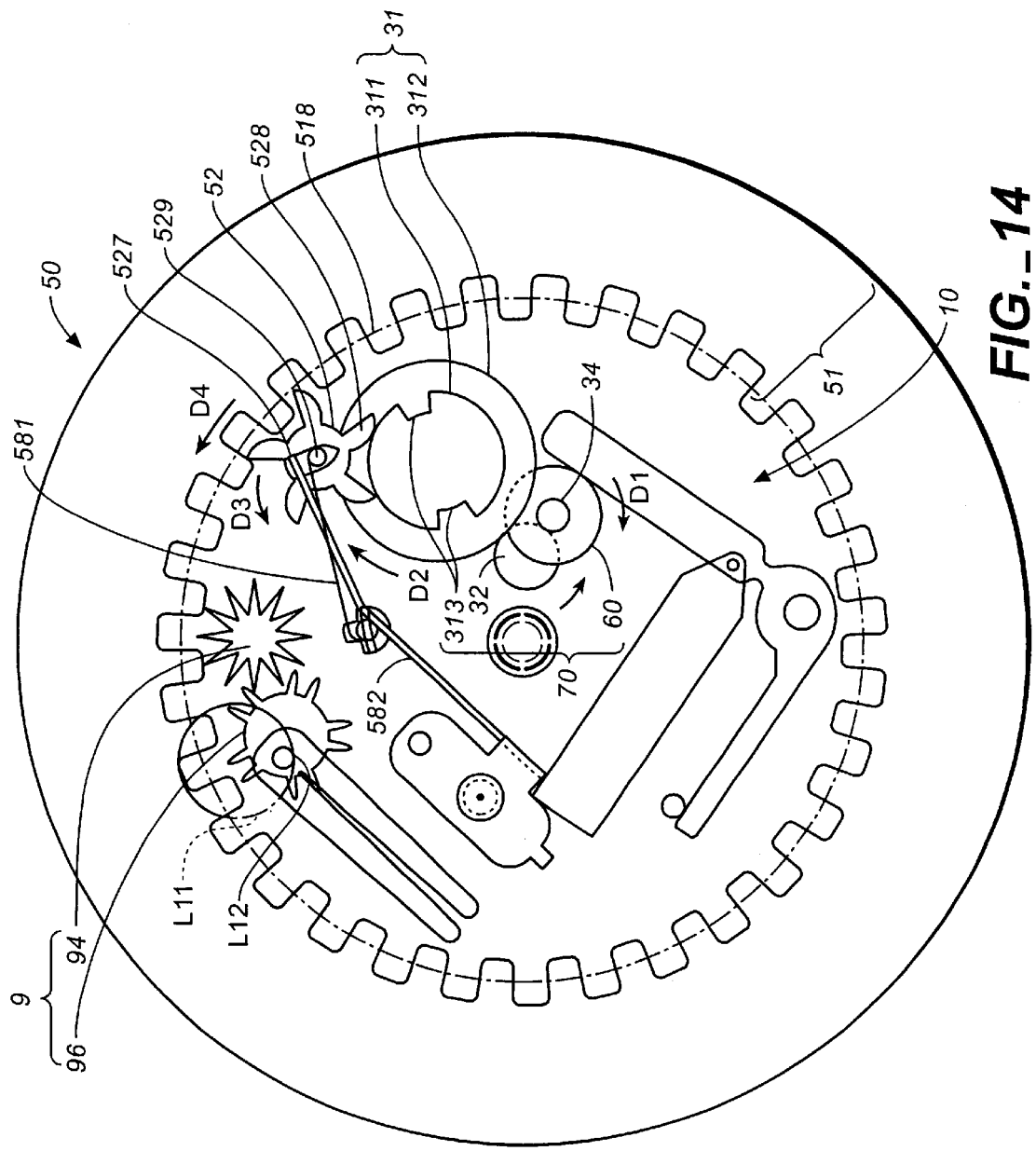
FIG._14

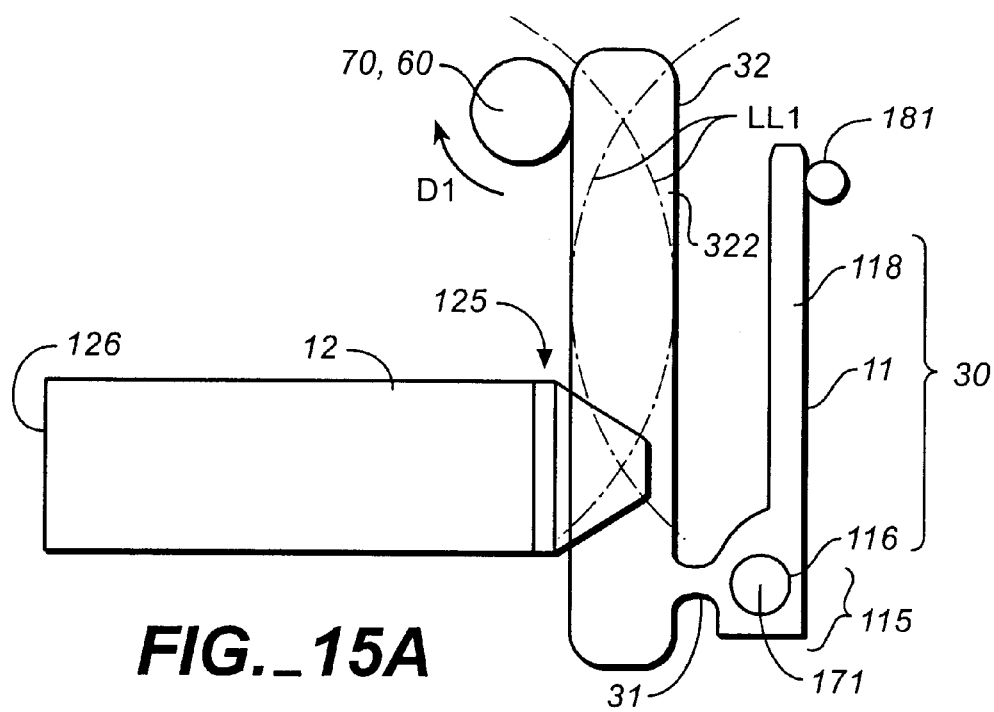
FIG._15A
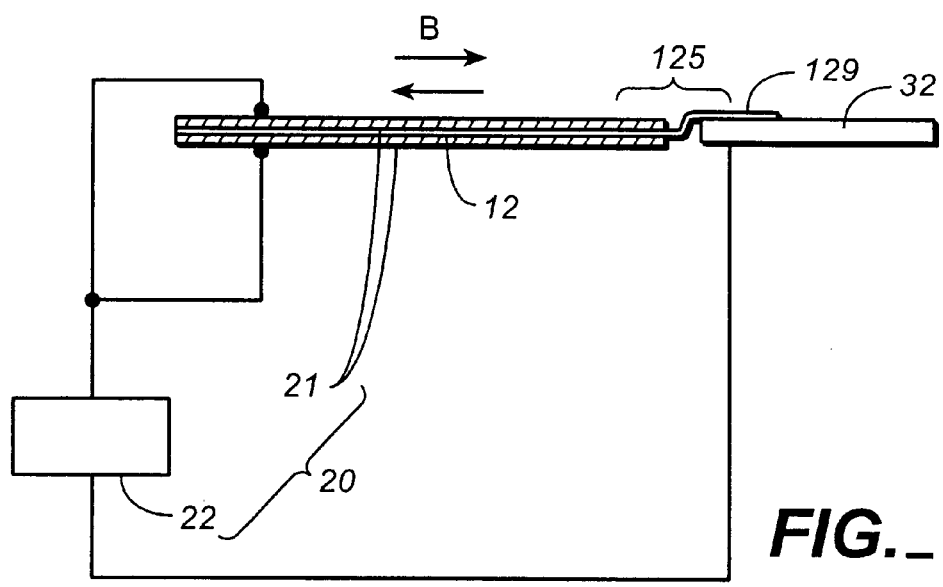
FIG._15B

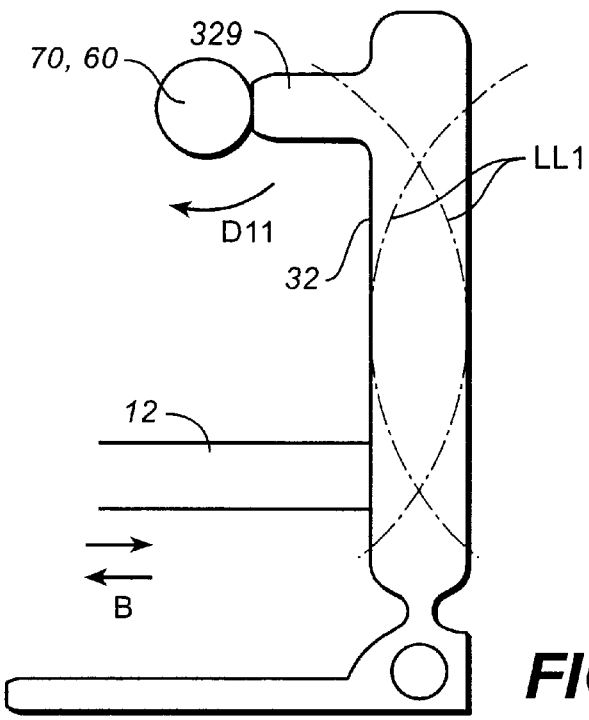
FIG._16A
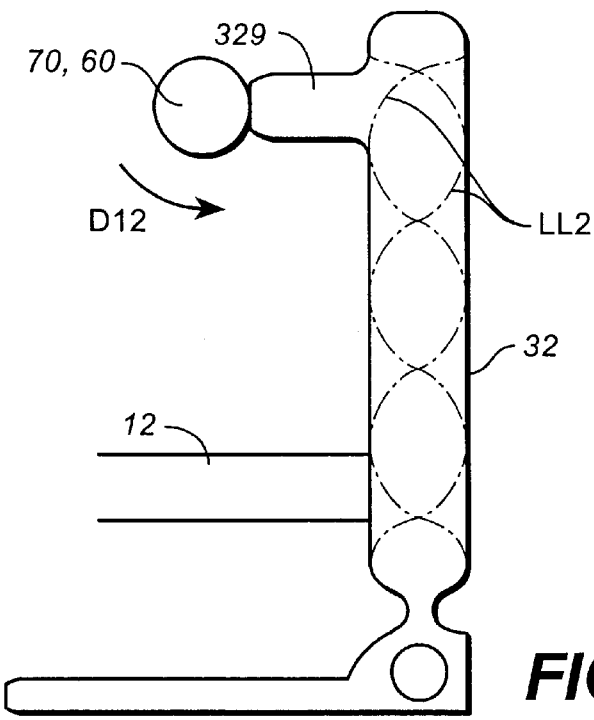
FIG._16B

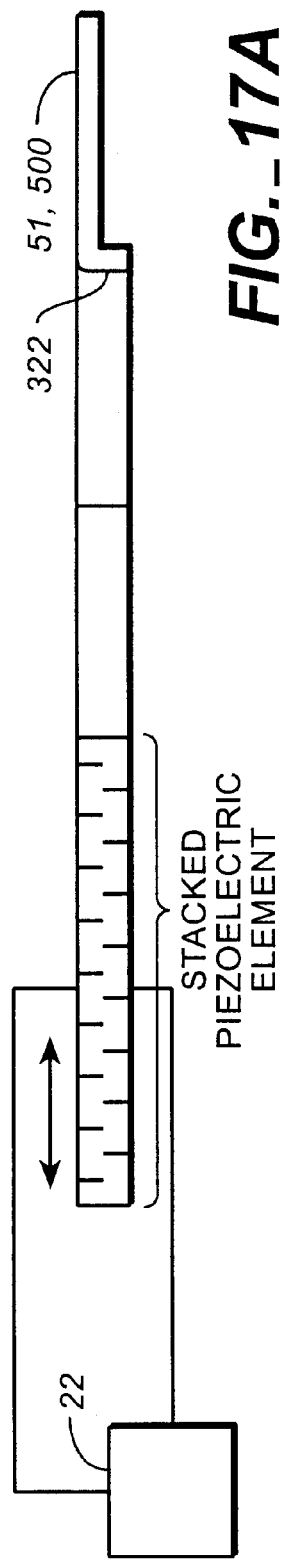
FIG._17A
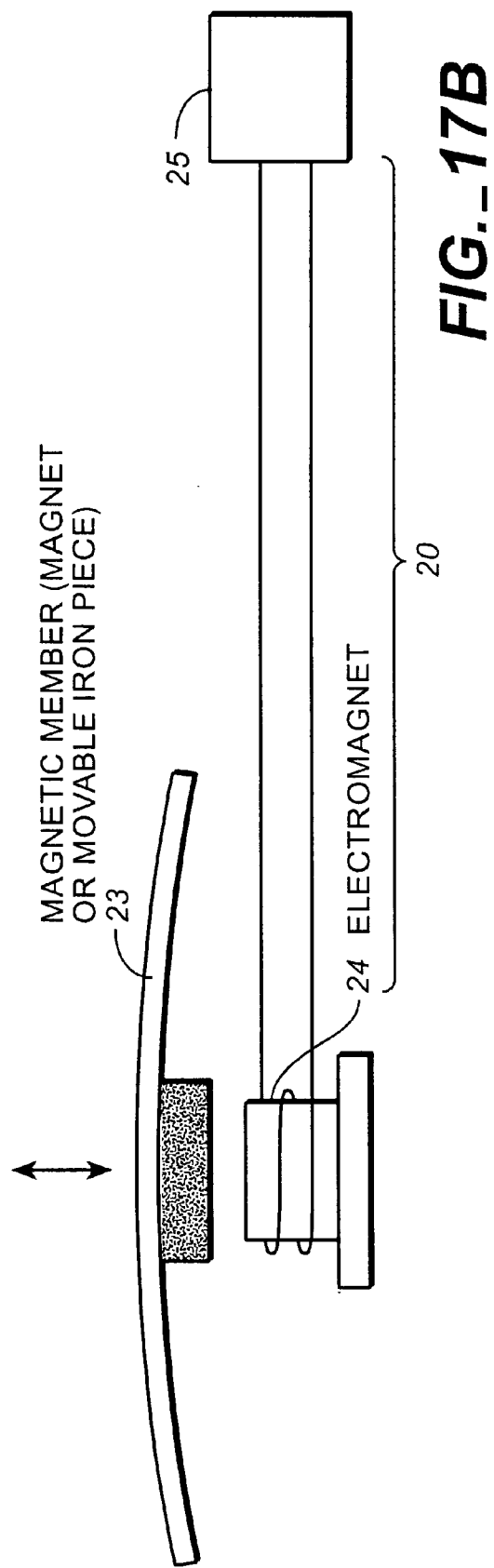
FIG._17B

ACTUATOR, AND TIMEPIECE AND NOTIFICATION DEVICE USING THE SAME

BACKGROUND OF THE INVENTION

1. Technical Field

The present invention relates to an actuator of a type using a vibrating plate, and to a timepiece and a notification device using the actuator. More particularly, the present invention relates to a structure for amplifying vibrations of the vibrating plate so as to output them as vibrations in an in-plane direction.

2. Background Art

In a calendar display mechanism for displaying a date, a day, and so forth in a wristwatch or the like, it is common for the rotational driving force from a step motor to be intermittently transmitted to a date indicator or the like through a watch-hand-driving train wheel so as to intermittently advance the date indicator or the like.

In addition, a sound producer is mounted in a so-called portable electronic device, such as a pager and a mobile phone, and receipt of a message is notified to a user by producing an audible sound from the sound producer. Since it is not adequate for the device of this type to produce the audible sound in some circumstances, a vibration generator (vibrator) is mounted therein, and the receipt of a message is notified to the user by sensible vibrations generated from the vibration generator.

However, in order to achieve a reduction in the thickness of a wristwatch, it is necessary to achieve a reduction in the thickness of a mechanism for calendar advancement; however, a conventional mechanism cannot achieve such a reduction in thickness. In addition, in recent years, actuators using piezoelectric elements have been used for camera shutters, ink-jet heads of printers, etc. Since these conventional actuators amplify and output bending vibrations of the piezoelectric elements in an out-of-plane direction as vibrations in the out-of-plane direction, it is necessary to arrange various types of components in the out-of-plane direction of the piezoelectric elements. Accordingly, it is difficult to achieve a further reduction in thickness in the conventional actuators.

In addition, in order to standardize mechanical systems of a timepiece with a calendar display mechanism and a timepiece without such a display mechanism, it is necessary to construct the calendar display mechanism on the side of a dial; however, it is impossible for an electromagnetic step motor to achieve a reduction in thickness to such an extent that the calendar mechanism can be constructed on the side of the dial.

Further, in order to automatically perform the date correction associated with a month with 30 days or fewer, a 31-day month, and a leap year, changeover of a mechanism section is required. However, since it is difficult for a thin timepiece main body to contain such a changing mechanism, there has been an inconvenience in that the date correction must be performed manually.

In addition, since the conventional sound producer and vibration generator mounted in the portable electronic device, such as a pager and a mobile phone, include a vibrating member and an exciting means, respectively, they occupy a large space in the portable electronic apparatus, and constitute a considerable portion of the weight. Accordingly, mounting both the sound producer and the vibration generator in the device of this type causes a problem of preventing a further reduction in size and weight of the portable electronic device.

OBJECTS OF THE INVENTION

Thus, it is an object of the present invention to provide an actuator of a new type which amplifies and outputs vibrations of a vibrating plate as vibrations in an in-plane direction, and to provide a timepiece and a notification device using the same.

In addition, it is an object of the present invention to provide an actuator which exhibits different functions with a single vibration source, thereby enabling a reduction in size and weight of a device having the actuator mounted therein, and to provide a timepiece and a notification device using the same.

DISCLOSURE OF INVENTION

To solve the above-mentioned problems, an actuator according to the present invention is characterized by comprising a vibrating plate at least one end portion thereof being displaced by vibrations in an in-plane direction as a movable end for transmitting displacement; an exciting means for allowing the vibrating plate to cause vibrations; and a vibration output system connected to the movable end so as to amplify and output displacement of connection between the vibration output system and the movable end in an in-plane direction as vibration in the in-plane direction.

In the present invention, when the exciting means actuates the vibrating plate, at least one end portion of the vibrating plate is displaced by vibrations thereof as a movable end for transmitting displacement. Here, the vibration output system is connected to the movable end for transmitting displacement, and the vibration output system amplifies and outputs the displacement of the movable end in the in-plane direction as vibration in the in-plane direction. Accordingly, the actuator of the present invention is of a new type which takes out vibrations of the vibrating plate as vibrations in the in-plane direction, can be constructed using few components, and can be formed in a narrow space across the thickness where the vibrating plate vibrates.

In the present invention, the displacement of the connection between the vibration output system and the movable end in the in-plane direction is vibration displacement in the in-plane direction associated with flexural vibrations of the vibrating plate in an out-of-plane direction. In addition, the displacement of the connection between the vibration output system and the movable end in the in-plane direction may be vibration displacement in the in-plane direction associated with longitudinal vibrations of the vibrating plate.

In the present invention, the vibrating plate may include the movable end connected to the vibration output system only at one end portion thereof, and the other end portion may be a stationary end.

In addition, in the present invention, the vibrating plate may include the movable end at both end portions thereof, and the vibration output system may be connected to movable ends of both end portions, respectively, as a first vibration output system and a second vibration output system. In addition, in the present invention, the vibrating plate may include the movable end connected to the vibration output system only at one end portion thereof, and the other end portion may be a free end. When the other end portion is a free end, a weight may be preferably attached thereto so as to prevent the vibrating plate from being vibrated accidentally by disturbance. In addition, if the weight is attached to the other end portion, there are advantages that the resonance frequency can be set to a low level, and the frequency can be adjusted by cutting the weight. Further, the vibrating plate may have a length longer than a width. This structure has advantages that the longitudinal vibrations (in the in-plane direction) are preferentially generated on the vibrating plate, and difficult-to-control generation of flexural vibrations can be prevented.

In the present invention, as the exciting means, a means including a piezoelectric element formed on at least one surface of the vibrating plate, and a driving circuit for the piezoelectric element may be used. Here, any type of unimorph, bimorph or stacked piezoelectric element may be used as the piezoelectric element. In addition, if the piezoelectric element is formed on the vibrating plate, the strength thereof can be maintained even if the piezoelectric element is thinned, and the capacity can be easily increased, so that electrical energy can easily enter into the actuator. In addition, since the piezoelectric element is merely stacked on the vibrating plate, this is suitable for reduction in thickness of the actuator.

Further, when the piezoelectric element is formed on at least one surface of the vibrating plate, a disturbance-monitoring means may be formed for detecting vibrations of the vibration output system caused by disturbance by an electromotive force generated in the piezoelectric element when the vibrating plate is vibrated by the vibrations.

Further, an output circuit may be constructed for outputting an electromotive force generated in the piezoelectric element when the vibration output system is vibrated by disturbance and the vibration is transmitted to the vibrating plate.

In addition, in the present invention, as the exciting means, a means including a magnetic member formed on the vibrating plate, an electromagnet opposing the magnetic member, and a driving circuit for the electromagnet may be used.

In the present invention, the vibration output system including a lever whose base end side is connected to the movable end of the vibrating plate and whose leading end side is a free end, and an elastic portion for supporting the base end side of the lever may be used. This structure allows the lever to be also included in the vibration system, so that the resonance frequency is reduced to a low level. Therefore, dissipation electric current of the driving circuit can be minimized. In addition, a decelerating mechanism is not required even if the date indicator (follower member) is translated in a calendar mechanism of a wristwatch described hereinbelow, so that the actuator is suitable for mounted in the thin device in this respect.

In this embodiment, when the vibrating plate includes the movable end connected to the lever only at one end portion thereof, and the other end portion is a free end, the vibrating plate and the lever may be preferably supported only by the elastic portion. This structure can prevent leakage of energy transmission from the vibrating plate to the lever.

In the present invention, a pressure spring for pressing a vibration output end of the lever to a follower member may be preferably further included. The pressure spring and the lever may preferably be integrally formed with a plate-like member. When the pressure spring and the lever are integrally formed with the plate-like member, the plate-like member may be preferably supported between the pressure spring and the lever in a rotatable state within a plane, and an end portion of the pressure spring may be positioned, whereby the vibration output end of the lever is pressed by the pressure spring toward the follower member.

In addition, when the vibration output system is composed of the elastic portion and the lever, the vibration output end of the lever is elastically in contact with the follower member by an elastic force of the elastic portion.

In the present invention, a plate-like member arranged two-dimensionally with respect to the vibrating plate may be preferably used as the vibration output system, and a constricted portion serving as the elastic portion may be formed on the plate-like member. In this case, if the width of the constricted portion is formed narrower than the thickness of the plate-like member, it becomes difficult for the lever to generate vibrations in the out-of-plane direction that are not required for driving the follower member. Accordingly, the vibrations in the out-of-plane direction are not transmitted to the follower member, and the vibrations in the in-plane direction can be transmitted to the follower member with efficiency.

In addition, the lever may be constructed as a plate-like lever arranged two-dimensionally with respect to the vibrating plate. This construction allows the components to be constructed by the plate-like member, so that the actuator can be further reduced in thickness.

In the present invention, the lever amplifies and outputs displacement of the connection between the movable end of the vibrating plate and the lever in the in-plane direction with a lever ratio corresponding to a ratio of a dimension from the elastic portion to the connected position of the movable end of the vibrating plate to a dimension from the elastic portion to the vibration output end of the lever.

In addition, the lever may generate resonance vibrations for bending the lever in the in-plane direction of the lever, thereby amplifying and outputting displacement of the connection between the movable end of the vibrating plate and the lever in the in-plane direction.

In the present invention, the vibrating plate may be preferably joined to a thin-walled portion of the plate-like member constituting the lever. This construction allows the connection (overlaid portion) between the vibrating plate and the lever to be formed into a thin portion.

In the present invention, the vibrating plate may be preferably constructed as a thin-walled portion formed on the plate-like member identical to the lever, thereby decreasing the number of components. In addition, when the vibrating plate and the lever are formed on the same plate-like member, since there is no junction by means of an adhesive or the like in a vibration transmission path from the vibrating plate to the lever, vibration absorption does not occur. Accordingly, there is provided an advantage that vibration transmission efficiency from the vibrating plate to the lever is improved.

In the present invention, the vibrating plate may be preferably connected to the lever so as to be located substantially in the center of the thickness of the lever. This construction prevents the vibrating plate and the lever from causing twisting when displacement is transmitted from the vibrating plate to the lever.

In addition, in the present invention, the vibrating plate may be preferably connected to the lever so as to be substantially perpendicular to the lever. This construction allows the displacement of the movable end of the vibrating plate in the in-plane direction to be transmitted with efficiency.

In the present invention, the vibration output system may be preferably constructed so as to transmit vibrations to the periphery of a sheet-like follower ring (follower member) substantially coplanar with the vibrating plate, thereby rotationally driving the follower ring circumferentially. In this case, the follower ring may be preferably arranged around the vibration output system and the vibrating plate, and the vibration output system may be preferably constructed so as to transmit vibrations to the inner periphery of the follower ring, thereby rotationally driving the follower ring circumferentially. This structure enables a reduction in thickness including also the follower member (thin plate-like ring). In this case, the vibration output system may preferably include a projection on the vibration output end abutting against the periphery of the follower ring.

In the present invention, the vibration output system may be preferably constructed so as to rotationally drive said follower ring via a decelerating mechanism. In this case, the decelerating mechanism may preferably include a roller against which the vibration output end of the vibration output system abuts. In addition, when the deceleration mechanism using the rotor is used, the vibration output system may preferably include a projection formed on the vibration output end abutting against the roller.

In the present invention, the exciting means may preferably allow the vibrating plate to cause first vibrations having a first vibration frequency and second vibrations having a second frequency different from the first frequency. For example, the exciting means allows the vibrating plate to cause the first vibrations at a resonance frequency of the vibration system including the vibrating plate, and the second vibrations at a frequency corresponding to a higher resonance frequency of the resonance frequency. This construction allows the exciting means to vibrate the vibrating plate at different frequencies, thereby outputting vibrations of different vibration frequencies, so that a device mounting therein the actuator can be reduced in size and weight such that an audible sound and sensible vibrations are generated utilizing the vibrations of different frequencies.

In the present invention, the vibrating plate may allow the lever used in said vibration output system to cause resonant vibrations for bending the lever by different degrees in the in-plane direction of the lever. In this case, the lever may preferably include a projection abutting against the follower member at the position between nodes in generating the resonant vibrations. This construction allows, when the lever generates resonant vibrations for bending the lever by different degrees in the in-plane direction thereof, the projection of the lever to vibrate in different directions, thereby driving the follower member. Accordingly, by merely varying the degree of the resonant vibration generated by the lever, the direction of movement (rotation direction) of the follower member can be reversed.

Since the actuator according to the present invention can be reduced in thickness, it is suitably used for a driving device of a calendar display mechanism in a timepiece. Here, when the vibration output system drives the thin-plate like follower ring as the follower member, the thin-plate like follower ring may be used as a ring-shaped calendar display wheel in the calendar display mechanism.

In addition, when the actuator including first and second vibration output systems is used as the driving device of the calendar display mechanism in the timepiece, a ring-shaped calendar display wheel which receives vibrations from the first and second vibration output systems by the inner periphery or outer periphery to rotate can also be used in the calendar display mechanism. The calendar display wheel may preferably include a plurality of notches formed on the inner periphery or outer periphery thereof in such a manner that when the vibration output end of one of the first and second vibration output systems is located within a notch during downtime of the actuator, the vibration output end of the other vibration output system is located out of the notch. This construction allows one of the vibration output end to be always located in a notch, and since the vibration output end located in the notch does not drive the calendar display wheel, it serves as a stopper. Therefore, a malfunction such that the calendar display wheel is accidentally rotated by disturbance can be prevented.

Since the actuator according to the present invention is suitable for a reduction in size and weight, it can be used as a notification device for notifying sensible vibrations or the like at least by the first vibrations of a low vibration frequency. In addition, since the actuator according to the present invention is suitable for a reduction in size and weight, the actuator may be preferably mounted in a portable electronic device or the like as a notification device for generating sensible vibrations by the first vibrations, and for producing an audible sound by the second vibrations

BRIEF DESCRIPTION OF THE DRAWINGS

FIGS. 1(A) and 1(B) are a plan view of an actuator according to a first embodiment of the present invention, and a sectional view of a principal part of the actuator used for driving a date indicator in a calendar display mechanism of a wristwatch, respectively.

FIGS. 2(A) and 2(B) are circuit block diagrams each showing an example of a driving circuit for driving the actuator according to the first embodiment of the present invention.

FIGS. 3(A) and 3(B) are a plan view of an actuator according to a second embodiment of the present invention, and a sectional view of a principal part of the actuator used for driving a date indicator in a calendar display mechanism of a wristwatch, respectively.

FIGS. 4(A) and 4(B) are a plan view of an actuator according to a third embodiment of the present invention, and a sectional view of a principal part of the actuator used for driving a date indicator in a calendar display mechanism of a wristwatch, respectively.

FIGS. 5(A) and 5(B) are a plan view of an actuator according to a fourth embodiment of the present invention, and a sectional view of a principal part of the actuator used for driving a date indicator in a calendar display mechanism of a wristwatch, respectively.

FIGS. 6(A) and 6(B) are a plan view of an actuator according to a fifth embodiment of the present invention, and a sectional view of a principal part of the actuator used for driving a date indicator in a calendar display mechanism of a wristwatch, respectively.

FIGS. 7(A) and 7(B) are a plan view and a sectional view of an actuator according to a sixth embodiment of the present invention, respectively.

FIGS. 8(A) and 8(B) are explanatory views each showing schematically bending vibrations of a vibrating plate in the actuator shown in FIG. 7.

FIGS. 9 is an explanatory view schematically showing an example in which the actuator shown in FIG. 7 is used for a notification device for producing an audible sound and sensible vibrations in a pager.

FIGS. 10(A) and 10(B) are a plan view of an actuator according to a seventh embodiment of the present invention, and a sectional view of a principal part of the actuator used for driving a date indicator in a calendar display mechanism of a wristwatch, respectively.

FIGS. 11(A) and 11(B) are a plan view of an actuator according to an eighth embodiment of the present invention, and a sectional view of a principal part of the actuator used for driving a date indicator in a calendar display mechanism of a wristwatch, respectively.

FIGS. 12(A) and 12(B) are a plan view of an actuator according to a ninth embodiment of the present invention, and a sectional view of a principal part of the actuator used for driving a date indicator in a calendar display mechanism of a wristwatch, respectively.

FIGS. 13(A) and 13(B) are sectional views of an actuator according to a tenth embodiment of the present invention, and a principal part thereof, respectively.

FIG. 14 is a plan view of a calendar display mechanism using the actuator shown in FIGS. 13(A) and 13(B).

FIG. 15(A) and 15(B) are sectional views of an actuator according to an eleventh embodiment of the present invention, and a principal part thereof, respectively.

FIGS. 16(A) and 16(B) are plan views of an actuator according to a twelfth embodiment of the present invention, respectively.

FIGS. 17(A) and 17(B) are an explanatory view showing an example in which a stacked piezoelectric element is used as an exciting means of an actuator to which the present invention is applied, and an explanatory view showing an example in which an electromagnet is used as the exciting means, respectively.

REFERENCE NUMERALS 10 actuator
11, 11A, 11B plate
12 vibrating plate
20 exciting means
30 vibration output system
21 unimorph-type piezoelectric element
22 driving circuit
31, 31A, 31B constricted portion (elastic portion)
32, 32A, 32B lever
50 calendar display mechanism
51 ring-shaped date indicator (calendar display wheel)
60 roller of decelerating mechanism
70 decelerating mechanism
117 thin-walled junction between vibrating plate and lever
121 first narrow portion of vibrating plate
122 second narrow portion of vibrating plate
125 one end of vibrating plate
126 the other end of vibrating plate
129 weight
300A first vibration system
300B second vibration system
321, 321A, 321B base end of lever
322, 322A, 322B free end of lever
500 follower member
511 inner periphery of date indicator
512 notch of date indicator
700 notification device
710 notifying vibrating plate (follower member)
720 receiving circuit
730 control section

BEST MODE FOR CARRYING OUT THE INVENTION

Embodiments of the present invention will be described with reference to the drawings.

FIRST EMBODIMENT

FIGS. 1(A) and 1(B) are a plan view and a sectional view of an actuator according to the first embodiment of the present invention, and a sectional view of a principal part thereof, respectively.

An actuator 10 shown in these drawings is roughly composed of a metallic plate 11 having a thickness of about 0.5 mm secured and fixed by screws to a base (not shown), on which the actuator 10 is mounted, at three sections, a metallic vibrating plate 12 having a thickness of about 0.05 mm which is arranged two-dimensionally with respect to the plate 11 and whose both ends are supported by the plate 11 so as to enable bending vibrations in an out-of-plane direction, and an exciting means 20 for allowing the vibrating plate 12 to cause bending vibrations. In addition, in the actuator 10 of this embodiment, a vibration output system 30 is constructed which amplifies and outputs the bending vibrations of the vibrating plate 12 in the out-of-plane direction as vibrations in an in-plane direction utilizing the above-mentioned plate 11.

The vibrating plate 12 is composed of a rectangular section 120 including a unimorph-type piezoelectric element 21 having a thickness of about 0.2 mm formed on the upper surface thereof, a first vibrating plate-side connection 123 connecting to one end portion 125, which should become a movable end, of both sides of the rectangular section 120 through a first narrow portion 121, and a second vibrating plate-side connection 124 connecting to the other end portion 126, which should become a stationary end, through a second narrow portion 122.

The exciting means 20 is composed of a unimorph-type piezoelectric element 21 formed on the upper surface of the vibrating plate 12, and a driving circuit 22 (see FIG. 1(B)) having an electrode (not shown) formed on the piezoelectric element 21 and the vibrating plate 12 as both poles, and applying a driving signal therebetween, and the driving circuit 22 applies a driving signal having a frequency corresponding to a resonance frequency of the vibration system of the actuator 10 to the piezoelectric element 21.

A separately-excited driving circuit which converts a signal output from an oscillation circuit 221 into a driving signal having a frequency corresponding to a resonance frequency of a vibration system in a frequency conversion circuit 222 to apply it to the piezoelectric element 21, as shown in FIG. 2(A), and a self-excited driving circuit which provides a filter 224 of a variable frequency and a switching circuit 225 for switching the frequency to a Colpitts oscillator 223, and which allows only a signal having a predetermined frequency to return by the switching circuit 225, whereby a driving signal having a frequency corresponding to the resonance frequency of the vibration system is applied to the piezoelectric element 21, as shown in FIG. 2(B) can be used as the driving circuit 22.

Referring to FIGS. 1(A) and 1(B) again, the plate 11 is composed of a main body section 111 arranged in parallel with the vibrating plate 12 and secured to the above-mentioned base by screws at both sides thereof, a lever 32 extending from a position located on the side of one end portion 125 of both ends of the main body section 111 that becomes a movable end of the vibrating plate 12 to the opposite side of the main body section 111 with respect to the vibrating plate 12 via the downside of the first vibrating plate-side connection 123 of the vibrating plate 12, and a plate-side connection 115 extending from a position located on the side of the other end portion 126 that becomes a stationary end of the vibrating plate 12 to the opposite side of the main body section 111 with respect to the vibrating plate 12 via the downside of the second vibrating plate-side connection 124 of the vibrating plate 12, and secured thereat to the base by a screw.

In the plate 11, a constricted portion 31 (elastic portion) is formed at a joint of the lever 32 and the main body section 111, and a part of the constricted portion 31 slightly near the leading end thereof that passes through the downside of the first vibrating plate-side connection 123 is a thin-walled junction 117 between the lever 32 and the vibrating plate 12. Accordingly, since the vibrating plate 12 is connected to the lever 32 at a thin-walled portion of a plate-like member (plate 11) constituting the lever 32, a connected portion (overlaid portion) between the vibrating plate 12 and the lever 32 can be formed into a thin portion. In this way, the lever 32 has a structure such that a base end side 321 is connected to the constricted portion 31 and the movable end of the vibrating plate 12, and a leading end extends therefrom as a free end 322 (vibration output end). In addition, since the vibrating plate 12 is connected to the lever 32 so as to be located in the center of the thickness of the lever 32, the vibrating plate 12 and the lever 32 do not cause twisting or the like when displacement of the vibrating plate 12 in the in-plane direction is transmitted to the lever 32.

By such a connection structure of the lever 32 and the vibrating plate 12, in this embodiment, a vibration output system 30 is formed which amplifies displacement of one end portion 125 (movable end) of the vibrating plate 12 in the in-plate direction to output the displacement as vibration in the in-plane direction from the free end 322 of the lever 32 when the vibrating plate 12 generates bending vibrations in the out-of-plane direction as described hereinbelow. The vibration output system 30 is constructed such that when the constricted portion 31 is regarded as a fulcrum, one end portion 125 (movable end) of the vibrating plate 12 and the free end 322 of the lever 32 are arranged on the same side with respect to the fulcrum. Accordingly, the lever 32 amplifies and outputs displacement of the connection between the movable end of the vibrating plate 12 and the lever 32 in the in-plane direction with a lever ratio corresponding to a ratio of a dimension from the constricted portion 31 to the connected position of the movable end of the vibrating plate 12 and the lever 32 to a dimension from the constricted portion 31 to the leading end (vibration output end) of the lever 32.

According to the thus constructed actuator 10, when a driving signal having a frequency corresponding to a resonance frequency of the vibration system is applied from the driving circuit 22 to the piezoelectric element 21 in the exciting means 20, since the first and second narrow portions 121 and 122 are formed between the rectangular section 120 and the plate 11, stretching vibrations of the piezoelectric element 21 (shown by the arrow A in FIG. 1(B)) allow the vibrating plate 12 to cause bending vibrations in the out-of-line direction. In addition, since the deformable constricted portion 31 is formed between the junction 117 and the main body section 111 of the plate 11 despite a complete junction between the vibrating plate 12 and the base end side 321 of the lever 32, when the vibrating plate 12 generates bending vibrations in the out-of-plane direction, one end portion 125, which should become the movable end of the vibrating plate 12, is elastically deformed at the constricted portion 31, thereby repeating displacement in the in-plane direction of the vibrating plate 12. Consequently, the lever 32 connected to one end portion 125 at the base end side 321 thereof vibrates in the in-plane direction of the vibrating plate 12 at the free end 322 using the constricted portion 31 as a fulcrum, and transmits it to a follower member 500, as shown by the arrow C.

In this way, the actuator 10 of this embodiment is of a new type which takes out bending vibrations of the vibrating plate 12 in the out-of-plane direction as vibrations in the in-plane direction using the free end 322 of the lever 32, and can be constructed by few components. In addition, since it is not necessary to arrange members above and below the vibrating plate 12, the actuator 10 can be formed in a narrow space across the thickness where the vibrating plate 12 generates bending vibrations in the out-of-plane direction, and can be mounted in a thin device. In addition, in this embodiment, since the lever 32 is connected to the vibrating plate 12, the vibration system includes the lever 32, so that the resonance frequency is low. Therefore, dissipation electric current of the driving circuit 22 can be minimized. In addition, a decelerating mechanism is not required even if the date indicator (follower member 500) is translated in a calendar mechanism of a wristwatch described hereinbelow. Thus, the actuator 10 is suitable for mounted in the thin device in this respect. Further, the plate 11 (plate-like member) arranged two-dimensionally with respect to the vibrating plate 12 is used as the vibration output system 30, and the constricted portion 31 of the plate 11 allows an end of the vibrating plate 12 to be displaced in the in-plane direction. Thus, since a thick spring or the like is not used, the thickness of the actuator 10 is suitably reduced. In addition, since vibrations are output from the plate-like lever 32, the thickness of the actuator 10 is also suitably reduced from this respect. Moreover, since the unimorph-type piezoelectric element 21 is formed as the exciting means 20 on the upper surface of the vibrating plate 12, the strength of the actuator 10 can be maintained even if the piezoelectric element 21 is thinned and the capacity can be easily increased, so that electrical energy can easily enter into the actuator 10. In addition, this is suitable for reduction in the thickness of the actuator 10.

As for the use of the thus constructed actuator 10, FIGS. 1(A) and 1(B) show an example in which the actuator 10 of this embodiment is used as a driving device of a calendar display mechanism 50 in a wristwatch. In the calendar display mechanism 50, a ring-shaped date indicator 51 (calendar display wheel) is substantially coplanar with the vibrating plate 12 in such a manner as to surround the vibrating plate 12 and the lever 32, and the date indicator 51 is positioned by two guides 501 and 502 contacting its inner periphery 511 and the free end 322 of the lever 32 of the actuator 10. In this state, the date indicator 51 receives vibrations from the vibration output system 30 (lever 32) by the inner periphery 511 to rotate circumferentially. That is, when the actuator 10 is actuated and the free end 322 of the lever 32 vibrates in the in-plane direction of the vibrating plate 12 about the constricted portion 31, the free end 322 of the lever 32 repeatedly taps the inner periphery 511 of the date indicator 51 in the direction shown by the arrow C for a predetermined period, so that the date indicator 51 is advanced in the direction shown by the arrow D by a predetermined rotation angle.

In such a calendar display mechanism 50, the actuator 10 of this embodiment can drive the date indicator 51 using a small number of components, and the actuator 10 occupies only a narrow space for the out-of-plane vibrations of the vibrating plate 12. Moreover, the date indicator 51 is a thin-walled member, and is substantially coplanar with the vibrating plate 12. Therefore, the actuator 10, and the calendar display mechanism 50 using it can be accommodated in a timepiece case thereof even if the wristwatch is reduced in thickness. For example, when standardization of mechanical systems is achieved in a timepiece with a calendar display mechanism and in a timepiece without a calendar display device, and the timepiece with the calendar display mechanism is constructed, the calendar display mechanism 50 can be incorporated onto the side of the dial. In addition, since the calendar display mechanism 50, which is mechanically independent from a train wheel for driving the watch hands, can be constructed, a perpetual calendar can be easily produced merely by outputting a driving signal from the driving circuit 20 at a predetermined timing based on the data recorded in a ROM, etc., and the need to manually perform date correction associated with a month with 30 days or fewer, a 31-day month, and a leap year is eliminated.

SECOND EMBODIMENT

FIG. 3(A) and 3(B) are a plan view and a sectional view of a principal part of an actuator 10 according to the second embodiment of the present invention, respectively. Incidentally, since the basic configurations are common to the first embodiment and this embodiment and all of the embodiments described later, the corresponding portions are indicated by the same reference numerals and a description thereof will be omitted.

The actuator 10 shown in these drawings is also roughly composed of a plate 11 having a thickness of about 0.5 mm secured and fixed by screws to a base (not shown), on which the actuator 10 is mounted, at two sections, a vibrating plate 12 having a thickness of about 0.05 mm which is arranged two-dimensionally with respect to the plate 11 and whose both ends are supported by the plate 11 so as to enable bending vibrations in an out-of-plane direction, and an exciting means 20 (see FIG. 2(B)) including a piezoelectric element 21 for allowing the vibrating plate 12 to cause vending vibrations, and a driving circuit 22. Since basic configurations of the vibrating plate 12 and the exciting means 20 for allowing it to cause bending vibrations are similar to those of the first embodiment, a description thereof will be omitted.

The actuator 10 of this embodiment is characterized in that a vibration output system 30 is constructed for outputting bending vibrations of the vibrating plate 12 in the out-of-plane direction as vibrations in the in-plane direction utilizing the above-mentioned plate 11. That is, the plate 11 is composed of a main body section 111 arranged in parallel with the vibrating plate 12 and secured to the above-mentioned base by screws at both ends thereof, a lever 32 extending from a position located on the side of one end portion 125 of both ends of the main body section 111 that becomes a movable end of the vibrating plate 12 to the opposite side of the vibrating plate 12, and a plate-side connection 115 extending from a position located on the side of the other end portion 126 that becomes a stationary end of the vibrating plate 12 to the downside of the other end portion 126.

In the plate 111, a constricted portion 31 (elastic portion) is formed at a joint of the lever 32 and the main body section 111, and a part of the constricted portion 31 slightly near the leading end thereof that extends to the opposite side of a free end 322 of the lever 32 to be overlaid on a first vibrating plate-side connection 123 is a thin-walled junction 117 between the lever 32 and the vibrating plate 12. Accordingly, since the vibrating plate 12 is connected to the lever 32 at a thinwalled portion of a plate-like member (plate 11) constituting the lever 32, a connected portion (overlaid portion) between the vibrating plate 12 and the lever 32 can be formed into a thin portion. In this way, the lever 32 has a structure such that a base end side 321 is connected to the constricted portion 31 adjacent to each other and one end portion 125 that becomes a movable end of the vibrating plate 12, and a leasing end extends therefrom as a free end 322.

By such a connection structure of the lever 32 and the vibrating plate 12, in this embodiment, a vibration output system 30 is formed which amplifies displacement of one end portion 125 that becomes a movable end of the vibrating plate 12 in the in-plane direction to output the displacement as vibration in the in-plane direction from the free end 322 of the lever 32 when the vibrating plate 12 generates bending vibrations in the out-of-plane direction as described hereinbelow.

In this embodiment, however, the vibration output system 30 is constructed such that when the constricted portion 31 is regarded as a fulcrum, the junction 117 between one end portion 125 (movable end) of the vibrating plate 12 and the plate 11, and the free end 322 of the lever 32 are arranged on the opposite side of the fulcrum.

Even in the thus constructed actuator 10, when a driving signal is applied from the driving circuit 22 to the piezoelectric element 21 in the exciting means 20, stretching vibrations (shown by the arrow A in FIG. 3(B)) of the piezoelectric element 21 allow the vibrating plate 12 to cause bending vibrations in the out-of-plane direction. In addition, when the vibrating plate 12 generates bending vibrations in the out-of-plane direction, one end portion 125 that should become the movable end of the vibrating plate 12 is elastically deformed at the constricted portion 31, thereby repeating displacement in the in-plane direction of the vibrating plate 12. Consequently, the lever 32 connected to one end portion 125 at the base end side 321 thereof vibrates in the in-plane direction of the vibrating plate 12 at the free end 322 using the constricted portion 31 as a fulcrum, and transmits it to a follower member 500, as shown by the arrow C.

In the case where the thus constructed actuator 10 is used as a driving device for a calendar display mechanism in a wristwatch similarly to the first embodiment, when the actuator 10 is actuated and the free end 322 of the lever 32 vibrates in the in-plane direction of the vibrating plate 12 about the constricted portion 31, the lever repeatedly taps the inner periphery of a date indicator 51 in the direction of the arrow C, so that the date indicator 51 is rotated in the direction shown by the arrow D to perform date advancement. In addition, in this embodiment, even if an external impact is applied to the vibrating plate 12 to bend the vibrating plate 12 in the out-of-plane direction during a date advancement interval, and one end portion 125 is displaced in such a manner that the vibrating plate 12 contracts, the displacement at this time acts as a force for pushing the free end 322 of the lever 32 to the outside. Accordingly, even if an impact or the like is applied from the outside when the actuator 10 of this embodiment is used as a driving device of the calendar display mechanism 50 in the wristwatch, the free end 322 of the lever 32 is brought into abutment with the inner periphery 511 of the ring-shaped date indicator 51 (calendar display wheel) more strongly, so that the date indicator 51 is not rotated accidentally. Therefore, the calendar display mechanism 50 can be realized in which the date indicator 51 is not rotated by disturbance.

Further, the lever 32 includes a projection 320 abutting against the inner periphery 511 of the date indicator 511 at a leasing end thereof. Accordingly, the lever 32 always drives the date indicator 51 at the portion of the projection 320, so that vibrations can be effectively transmitted to the date indicator 51.

THIRD EMBODIMENT

FIGS. 4(A) and 4(B) are plan view, and a sectional view of a principal part of an actuator 10 according to the third embodiment of the present invention, respectively.

The actuator 10 shown in these drawings is also roughly composed of two sheets of plates 11A and 11B each having a thickness of about 0.5 mm secured and fixed by screws to a base (not shown) on which the actuator 10 is mounted, a vibrating plate 12 having a thickness of about 0.05 mm which is arranged two-dimensionally with respect to the plates 11A and 11B and whose both ends are supported by each of the plates 11A and 11B so as to enable bending vibrations in an out-of-plane direction, and an exciting means 20 including a piezoelectric element 21 for allowing the vibrating plate 12 to cause bending vibrations, and a driving circuit 22. Since the basic configuration of the vibrating plate 12 is similar to that of the first embodiment, a description thereof will be omitted.

In the actuator 10 of this embodiment, first and second vibration output systems 30A and 30B are constructed which amplify and output bending vibrations of the vibrating plate 12 in the out-of-plane direction as vibrations in the in-plane direction utilizing the two sheets of plates 11A and 11B. That is, in the vibration output systems 30A and 30B, the plates 11A and 11B support the vibrating plate 12 so that both end portions 125 and 126 operate as movable ends, and first and second levers 32A and 32B, which output displacement of each movable end in the in-plane direction as a vibration in the in-plane direction when the vibrating plate 12 generates bending vibration in the out-of-plane direction, are connected to the end portions 125 and 126, respectively.

In constructing as described above, the first plate 11A is composed of a portion 118A secured by a screw to the above-mentioned base, and a first lever 32A extending from the portion to the opposite side of the vibrating plate 12 via the downside of a first vibrating plate-side connection 123 formed on one end portion 125 of the vibrating plate 12. The second plate 11B is arranged in a point symmetrical manner with respect to the first plate 11A around the vibrating plate 12; however, the second plate 11B is, similarly to the first plate 11A, composed of a portion 118B secured by a screw to the above-mentioned base, and a second lever 32B extending from the portion to the opposite side of the vibrating plate 12 via the downside of a second vibrating plate-side connection 124 formed on the other end portion 126. Here, the first and second vibrating plate-side connections 123 and 124 of the vibrating plate 12 are joined to base end sides 321A and 321B of the first and second levers 32A and 32B.

In addition, in both of the first and second plates 11A and 11B, since first and second constricted portions 31A and 31B (elastic portions) are formed at joints of the first and second levers 32A and 32B and main body sections 118A and 118B, the first and second vibrating plate-side connections 123 and 124 of the vibrating plate 12 are joined to the base end sides 321A and 321B of the first and second levers 32A and 32B at the parts of the constricted portions 31A and 31B slightly near the leading ends thereof. Accordingly, the first and second levers 32 have a structure such that the base end sides 321A and 31B are connected to the first and second constricted portions 31A and 31B adjacent to each other and the end portions 125 and 126 of the vibrating plate 12, respectively, and leading ends extend therefrom as the free ends 322A and 322B.

By such a connection structure of the first and second levers 32A and 32B and the vibrating plate 12, in this embodiment, first and second vibration output systems 30A and 30B are formed which amplify displacement of both end portions 125 and 126 in the in-plane direction that become movable ends to output the displacement as vibration in the in-plane direction from the free ends 322A and 322B of the first and second levers 32A and 32B when the vibrating plate 12 generates bending vibrations in the out-of-plane direction as described hereinbelow. The first and second vibration output systems 30A and 30B are, similarly to the first embodiment, constructed such that when the first, and second constricted portions 31A and 31B are regarded as fulcrums, junctions between the vibrating plate 12 and the first and second levers 32A and 32B, and the free ends 322A and 322B of the first and second levers 32A and 32B are arranged on the same side with respect to these fulcrums. Accordingly, the first and second levers 32A and 32B amplify and output displacement of the connection between the movable ends of the vibrating plate 12 and the levers 32A and 32B with a lever ratio corresponding to a ratio of a dimension from the first and second constricted portions 31A and 31B to the connected positions of the movable ends of the vibrating plate 12 and the levers 32A and 32B to a dimension from the first and second constricted portions 31A and 31B to the leading ends (vibration output ends) of the first and second levers 32A and 32B.

According to the thus constructed actuator 10, since the first lever 32A is long and the second lever 32b is short, the first lever 32A has a mass larger than that of the second lever 32B. For this reason, the resonance frequency of a first vibration system 300A including the vibrating plate 12 and the first vibration output system 30A is lower than a resonance frequency of a second vibration system 300B including the vibrating plate 12 and the second vibration output section 30B.

Thus, in this embodiment, the driving circuit 22 constituting the exciting means 20 is constructed so as to output a driving signal corresponding to the resonance frequency of the first vibration system 300A and a driving signal corresponding to the resonance frequency of the second vibration system 300B. Accordingly, when the driving circuit 22 applies the driving signal corresponding to the resonance frequency of the first vibration system 300A to the piezoelectric element 21, the vibrating plate 12 generates bending vibrations corresponding to the resonance frequency of the first vibration system 300A, so that the other end portion 126 of the vibrating plate 12 becomes a stationary end at this time, and only one end portion 125 vibrates as a movable end in the in-plane direction. Consequently, the first lever 32A whose base end side 321A is connected to one end portion 125 vibrates at the free end 322A in the in-plane direction of the vibrating plate 12 using the first constricted portion 31A as a fulcrum, and transmits it to a follower member 500, as shown by the arrow CA. In contrast, when the driving circuit 22 applies the driving signal corresponding to the resonance frequency of the second vibration system 300B to the piezoelectric element 21, the vibrating plate 12 generates bending vibrations corresponding to the resonance frequency of the second vibration system 300B, so that one end portion 125 becomes a stationary end at this time, and only the other end portion 126 vibrates as a movable end in the in-plane direction. Consequently, the second lever 32 whose base end side 321B is connected to the other end portion 126 vibrates in the in-plane direction of the vibrating plate 12 at the free end 322B using the second constricted portion 31B as a fulcrum, and transmits it to the follower member 500, as shown by the arrow CB.

Here, when the first lever 32A is compared with the second lever 32B, the operation of the free end 322B of the second lever 32B has a high frequency, but the free end 322A of the first lever 32A is large in amplitude. Accordingly, in this embodiment, a normal advancement operation of the calendar display is effected by the second lever 32B, and a fast advancement of the calendar display is effected by the first lever 32A.

When the thus constructed actuator 10 is used as a driving device of a calendar display mechanism 50 in a wristwatch similarly to the first embodiment, the actuator 10 is arranged so that both of the free ends 322A and 322B of the first and second levers 32A and 32B are inscribed in the date indicator 51. In the thus constructed state, during the normal date advancement, the driving signal corresponding to the resonance frequency of the second vibration system 300B is applied from the driving circuit 22 to the piezoelectric element 21, and the date indicator 51 is rotated by the second lever 32B in the direction of the arrow D. In contrast, when the date indicator 51 is fast advanced in order to correct the date display, the driving signal corresponding to the resonance frequency of the first vibration system 300A is applied from the driving circuit 22 to the piezoelectric element 21, and the date indicator 51 is fast-advanced by the first lever 32A in the direction of the arrow D. In this way, if the vibrating plate 12 is allowed to cause bending vibrations at different frequencies so as to selectively vibrate the first and second vibration output systems 30A and 30B in one actuator 10, the rotation speed of the date indicator 51 can be changed without the changeover of the train wheel using a complicated changing mechanism. Therefore, the date correction associated with a month with 30 days or fewer, a 31-day month, and a leap year can be easily performed.

FOURTH EMBODIMENT

FIGS. 5(A) and 5(B) are a plan view and a sectional view of a principal part of an actuator 10 according to the fourth embodiment of the present invention.

The actuator 10 shown in these drawings is similar to that of the first embodiment in that the actuator 10 is roughly composed of a plate 11 having a thickness of about 0.5 mm secured and fixed by screws to a base (not shown), on which the actuator 10 is mounted, at two sections, a vibrating plate 12 having a thickness of about 0.05 mm which is arranged two-dimensionally with respect to the plate 11 and whose both ends are supported by the plate 11 so as to enable bending vibrations in an out-of-plane direction, and an exciting means 20 including a piezoelectric element 21 for allowing the vibrating plate 12 to cause vending vibrations, and a driving circuit 22. Since the basic configuration of the vibrating plate 12 is similar to that of the first embodiment, a description thereof will be omitted.

In the actuator 10 of this embodiment, similarly to the first embodiment, the vibrating plate 12 is supported utilizing the above-mentioned plate 11 so that both end portions 125 and 126 are operated as movable ends, respectively, and first and second vibration output systems 30A and 30B which amplify and output displacement of the both end portions 125 and 126 (movable ends) in an in-plane direction as vibration in the in-plane direction when the vibrating plate 12 generates the bending vibrations in an out-of-plane direction are constructed at the both end portions 125 and 126, respectively. In this embodiment, the first and second vibration systems 30A and 30B are constructed so as to drive the same follower member 500 in opposite directions, respectively.

In constructing such vibration output systems, in this embodiment, first and second levers 32A and 32B, which extend to the opposite side of the vibrating plate 12 via the downside of first and second vibrating plate-side connections 123 and 124 extending from both end portions of a main body section 111 in the same direction and formed at both end portions 125 and 126, are formed in the plate 11, and free ends 322A and 322B of the first and second levers 32A and 32B are facing each other.

In the first and second levers 32A and 32B, first and second constricted portions 31A and 31B are formed at joints of main body section 111 and the levers 32A and 32B, respectively, and base end portions 321A and 321B passing through the downside of the first and second vibrating plate-side connections 123 and 124 on the side slightly near the leading ends of the first and second constricted portions 31A and 31B are junctions between the levers 32A and 32B and the vibrating plate 12. Accordingly, the first and second levers 32A and 32B have a structure such that the base end sides 321A and 321B are connected to the first and second constricted portions 31 adjacent to each other and the end portions 125 and 126 of the vibrating plate 12, respectively, and leading ends extend therefrom as free ends 322A and 322B.

By such a connection structure of the first and second levers 32A and 32B and the vibrating plate 12, in this embodiment, first and second vibration output systems 30A and 30B are formed which amplify displacement of the end portions 125 and 126 (movable end) in an in-plane direction to output the displacement as vibration in the in-plane direction from the free ends 322A and 322B of the first and second lever 32A and 32B when the vibrating plate 12 generates bending vibrations in the out-of-plane as described hereinbelow. The first and second vibration output systems 30A and 30B have a structure such that when the first and second constricted portions 31A and 31B are regarded as fulcrums, junctions between the end portions 125 and 126 and the first and second levers 32A and 32B, and the free ends 322A and 322B of the levers 32A and 32B are arranged on the same side with respect to these fulcrums.

Even in the thus constructed actuator 10, since the first lever 32 is long and the second lever 32 is short, the first lever 32 has a mass larger than that of the second lever 32. For this reason, the resonance frequency of a first vibration system 300 including the vibrating plate 12 and a first vibration output system 30A is lower than a resonance frequency of a second vibration system 300B including the vibrating plate 12 and the second vibration output section 30B.

Even in the thus constructed actuator 10, the driving circuit 22 constituting the exciting means 20 can output a driving signal corresponding to the resonance frequency of the first vibration system 300A and a driving signal corresponding to the resonance frequency of the second vibration system 300B. Accordingly, when the driving circuit 22 applies the driving signal corresponding to the resonance frequency of the first vibration system 300A, only one end portion 125 of the vibrating plate 12 vibrates as a movable end in the in-plane direction. Consequently, the first lever 32A whose base end side 321A is connected to one end portion 125 vibrates at the free end 322A in the in-plane direction of the vibrating plate 12 using the first constricted portion 31 as a fulcrum, and transmits it to a follower member 500, as shown by the arrow CA.

In contrast, when the driving circuit 22 applies the driving signal corresponding to the resonance frequency of the second vibration system 300B to the piezoelectric element 21, only the other end portion 126 of the vibrating plate 12 vibrates as a movable end in the in-plane direction. Consequently, the second lever 32A whose base end side 321B is connected to the other end portion 126 vibrates in the in-plane direction of the vibrating plate 12 at the free end 322B using the second constricted portion 31B as a fulcrum, and transmits a force in the direction opposite to the first lever 32A to the follower member 500, as shown by the arrow CB.

When the thus constructed actuator 10 is used as a driving device of a calendar display mechanism 50 in a wristwatch similarly to the first embodiment, the actuator 10 is arranged so that both of the free ends 322A and 322B of the first and second levers 32A and 32B are inscribed in the date indicator 51. In the thus constructed state, during the normal date advancement, the driving signal corresponding to the resonance frequency of the first vibration system 300A is applied from the driving circuit 22 to the piezoelectric element 21, and the date indicator 51 is rotated by the first lever 32A in the direction shown by the arrow DA. In contrast, when the date indicator 51 is reversed in order to correct the date display, the driving signal corresponding to the resonance frequency of the second vibration system 300B is applied from the driving circuit 22 to the piezoelectric element 21, and the date indicator 51 is reversed by the second lever 32B in the direction shown by the arrow DB. In this way, if the vibrating plate 12 is allowed to cause bending vibrations at different frequencies so as to selectively vibrate the first and second vibration output systems 30A and 30B, the direction of rotation and the rotation speed of the date indicator 51 can be changed without the changeover of the train wheel using a complicated changing mechanism.

FIFTH EMBODIMENT

FIGS. 6(A) and 6(B) are a plan view and a sectional view of a principal part of an actuator 10 according to the fifth embodiment of the present invention.

The actuator 10 shown in these drawings is roughly composed of two sheets of plates 11A and 11B each having a thickness of about 0.5 mm secured and fixed by screws to a base (not shown) on which the actuator 10 is mounted, a vibrating plate 12 having a thickness of about 0.05 mm which is arranged tow-dimensionally with respect to the plates 11A and 11B and whose both ends are supported by each of the plates 11A and 11B so as to enable bending vibrations in an out-of-plane direction, and an exciting means 20 including a piezoelectric element 21 for allowing the vibrating plate 12 to cause bending vibrations, and a driving circuit 22. Since the basic configuration of the vibrating plate 12 is similar to that of the first embodiment, a description thereof will be omitted.

The actuator 10 of this embodiment is firstly characterized in that first and second vibration output systems 30A and 30B are constructed for outputting bending vibrations of the vibrating plate 12 in the out-of-plane direction as vibrations in the in-plane direction utilizing the above-mentioned two sheets of plates 11A and 11B. In addition, this embodiment is secondly characterized in that the first and second vibration output systems 30A and 30B are alternately operated so that one of the two output systems serves as a stopper.

That is, in this embodiment, similarly to the fourth embodiment, first and second levers 32A and 32B are constructed in the first and second plates 11A and 11B, respectively, and first and second constricted portions 31A and 31B are formed at joints of the first and second levers 32A and 32B and main body sections 118A and 118B, respectively. Here, the first and second levers 32 have the same length and different mass, and there is a difference in resonance frequency between a first vibration system 300A including the vibrating plate 12 and the first vibration output system 30 and a second vibration system 300B including the vibrating plate 12 and the second vibration output system 30. Accordingly, the driving circuit 22 constituting the exciting means 20 outputs a driving signal corresponding to the resonance frequency of the first and second vibration systems 300A and 300B with staggered timing, and free ends 322A and 322B of the first and second levers 32A and 32B are vibrated sequentially in the in-plane direction of the vibrating plate 12 using the first and second constricted portions 31A and 31B as fulcrums, and the vibrations are transmitted to a follower member.

In this embodiment, when the thus constructed actuator 10 is used as a driving device of a calendar display mechanism 50 in a wristwatch similarly to the first embodiment, the actuator 10 is arranged so that both of the free ends 322 of the first and second levers 32 are inscribed in the date indicator 51.

In this embodiment, however, a plurality of notches 512 are formed on the inner periphery 511 of the date indicator 51 at predetermined intervals, and when one of the levers 32A and 32B of the first and second vibration output systems 30 is located within a notch 512 during downtime of the actuator 10, the other lever is always located out of the notch 512 (portion corresponding to a crest portion 513). For this reason, when advancing the date, a driving signal corresponding to the resonance frequency of the vibration system including the lever located out of the notch 512 and abutting strongly against the inner periphery 511 of the date indicator is applied from the driving circuit 22 to the piezoelectric element 21 so as to rotate the date indicator 51 by the lever. Such a rotation is performed until the free end of the lever enters into the notch 512 to be rotated freely. In this way, when the rotation of the date indicator 51 by one step is finished, the lever 32 that has been located out of the notch 512 to drive the date indicator 51 is fitted into the notch 512, whereas the lever 32 that has been located within the notch 512 and that has not been concerned in driving the date indicator 51 is located out of the notch 512. In this way, during downtime of the actuator 10, if one of the levers 32A and 32B of the first and second vibration output system 30A and 30B is located within the notch 512, the lever within the notch 512 serves as a stopper. Therefore, even if a disturbance, such as an impact, is applied from the outside to the date indicator 51, the date indicator 51 is not rotated accidentally.

SIXTH EMBODIMENT

FIGS. 7(A) and 7(B) are a plan view and a sectional view of an actuator according to the sixth embodiment of the present invention, respectively.

An actuator 10 shown in these drawings is, similarly to the first embodiment, composed of a metallic plate 11 having a thickness of about 0.5 mm secured and fixed by screws to a base (not shown) at three sections, a metallic vibrating plate 12 having a thickness of about 0.05 mm which is arranged two-dimensionally with respect to the plate 11 and whose both ends are supported by the plate 11 so as to enable bending vibrations in an out-of-plane direction, and an exciting means 20 for allowing the vibrating plate 12 to cause bending vibrations. In addition, in the actuator 10, a vibration output system 30 is constructed which amplifies and outputs the bending vibrations of the vibrating plate 12 in the out-of-plate direction as vibrations in an in-plane direction utilizing the above-mentioned plate 11.

In this embodiment, the vibrating plate 12 is also composed of a rectangular section 120 including a unimorph-type piezoelectric element 21 having a thickness of about 0.2 mm formed on the upper surface thereof, a first vibrating plate-side connection 124 connecting to one end portion 125, which should become a movable end, of both sides of the rectangular section 120 through a first narrow portion 122, and a second vibrating plate-side connection 123 connecting to the other end portion 126, which should become a stationary end, through a second narrow portion 121.

The plate 11 is composed of a main body section 111 arranged in parallel with the vibrating plate 12 and secured to the above-mentioned base by screws at both ends thereof, a plate-side connection 115 extending from a position located on the side of one end portion 126 of both ends of the main body section 111 that becomes a stationary end of the vibrating plate 12 to the opposite side of the main body section 111 with respect to the vibrating plate 12 via the downside of the first vibrating plate-side connection 124 of the vibrating plate 12, and secured thereat to the base by a screw, and a lever 32 extending from a position located on the side of the other end portion 125 that becomes a movable end of the vibrating plate 12 to the opposite side of the main body section 111 with respect to the vibrating plate 12 via the downside of the second vibrating plate-side connection 123 of the vibrating plate 12.

A constricted portion 31 is formed at a joint of the lever 32 and the main body section 111, a part of the constricted portion 31 slightly near the leading end thereof that passes the downside of the first vibrating plate-side connection 123 of the vibrating plate 12 is a junction between the lever 32 and the vibrating plate 12. Accordingly, the lever 32 has a structure such that a base side end 321 is connected to the constricted portion 31 and the movable end of the vibrating plate 12 adjacent to each other, and a leading end extends therefrom as a free end 322.

By connecting the vibrating plate 12 to the lever 32 in this way, in this embodiment, a vibration output system 30 is formed which amplifies displacement of the other end portion 125 (movable end) of the vibrating plate 12 in the in-plane direction to output the displacement as vibration in the in-plane direction from the free end 322 of the lever 32 when the vibrating plate 12 generates bending vibrations in the out-of-plane direction. The vibration output system 30 is constructed such that when the constricted portion 31 is regarded as a fulcrum, the other end portion 125 (movable end) of the vibrating plate 12 and the free end 322 of the lever 32 are arranged on the same side with respect to the fulcrum.

Here, the exciting means 20 is composed of the unimorph-type piezoelectric element 21 formed on the upper surface of the vibrating plate 12, and a driving circuit 22 (see FIG. 7(B)) having the piezoelectric element 21 and the vibrating plate 12 as both poles, and applying a driving signal therebetween, and the driving circuit 22 applies a driving signal having a predetermined frequency to the piezoelectric element 21.

Similarly to the first embodiment, a separately-excited driving circuit which converts a signal output from an oscillation circuit 221 into a driving signal having a frequency corresponding to a resonance frequency of a vibration system in a frequency conversion circuit 222 to apply it to the piezoelectric element 21, as shown in FIG. 2(A), and a self-excited driving circuit which provides a filter 224 of a variable frequency and a switching circuit 225 for switching the frequency to a Colpitts oscillator 223, and which allows only a signal having a predetermined frequency to return by the switching circuit 225, whereby a driving signal having a frequency corresponding to the resonance frequency of the vibration system is applied to the piezoelectric element 21, as shown in FIG. 2(B) can be used as the driving circuit 22.

In this embodiment, it is possible for any type of the above-mentioned driving circuit 22 to switch the frequency of the driving signal to be output, and as described hereinbelow, the exciting means 20 allows the vibrating plate 12 to cause first vibrations having a first frequency, and second vibrations having a second frequency different from the first frequency. Here, the exciting means 20 allows the vibrating plate 12 to cause vibrations at a resonance frequency of a vibration system including the vibrating plate 12, elastic portion consisting of the constricted portion 32, and the lever 31 as the first vibrations, and to cause vibrations at a frequency corresponding to a higher resonance frequency of the resonance frequency as the second vibrations.

That is, referring to FIGS. 2, 7(A) and 7(B), when the driving circuit 22 applies the driving signal having a frequency corresponding to the resonance frequency of the vibration system including the vibrating plate 12 and the lever 32 to the piezoelectric element 21, since the first and second narrow portions 121 and 122 are formed between the rectangular section 120 and the plate 11, the vibrating plate 12 generates bending vibrations (first vibrations) at a vibration frequency (first frequency) corresponding to the driving signal, as schematically shown by the arrow A in FIG. 8(A). At this time, one end portion 126 of the vibrating plate 12 becomes a stationary end, and only the other end portion 125 vibrates as a movable end in the in-plane direction shown by the arrow F. Consequently, as will be understood from FIG. 7, the lever 32 whose base end side 321 is connected to the other end portion 125 vibrates at the free end 322 in the in-plane direction of the vibrating plate 12 using the constricted portion 31 as a fulcrum, as shown by the arrow C, and transmits it to a follower member (not shown). Therefore, sensible vibrations or the like can be generated.

In addition, when the driving circuit 22 applies the driving signal having a frequency corresponding to the higher resonance frequency of the resonance frequency of the vibration system (a natural frequency corresponding to the resonance frequency of the vibration system including the vibrating plate 12 but not including the lever 32) to the piezoelectric element 21, the vibrating plate 12 generates bending vibrations (second vibrations) at a vibration frequency (second vibration frequency) corresponding to the driving signal, as schematically shown by the arrow A in FIG. 8(B). At this time, one end portion 126 also becomes a stationary end, and only the other end portion 125 vibrates as a movable end in the in-plane direction shown by the arrow F. Since the driving signal is of a frequency corresponding to the higher resonance frequency, however, the vibrations (second vibrations) at this time have a high vibration frequency and small amplitude as compared with the vibrations (first vibrations) when the driving signal is of the frequency corresponding to the resonance frequency of the vibration system. Consequently, the lever 32 whose base end side 321 is connected to the other end portion 125 little vibrates, and does not transmit the vibration to the follower member (not shown). Instead, a vibration sound of the vibrating plate 12 can be utilized as an alarm sound. Alternatively, an alarm sound can be produced from the follower member utilizing the second vibrations (vibrations at a frequency corresponding to the higher resonance frequency).

In this way, in the actuator 10 of this embodiment, the exciting means 20 vibrates one vibrating plate 12 at different frequencies, and outputs vibrations of different vibration frequencies. Therefore, driving of the follower member and producing of an alarm sound, or generation of an audible sound and sensible vibrations can be effected utilizing the vibrations of different frequencies, and a reduction in size and weight of a device having the actuator 10 mounted therein can be achieved.

In addition, the actuator 10 of this embodiment is of a new type which takes out bending vibrations of the vibrating plate 12 in the out-of-plane direction as vibrations in the in-plane direction by the free end 322 of the lever 32, and can be constructed using few components. In addition, since it is not necessary to arrange members above and below the vibrating plate 12, the actuator 10 can be formed in a narrow space across the thickness where the vibrating plate 12 generates bending vibrations in the out-of-plane direction, and can be mounted in a thin device. In addition, in this embodiment, since the lever 32 is connected to the vibrating plate 12, the vibration system includes the lever 32, so that the resonance frequency is low. Therefore, as described hereinbelow, even if the follower member is translated, a decelerating mechanism is not required. Thus, the actuator 10 is suitable for mounted in the thin device in this respect. Further, the plate 11 (plate-like member) arranged two-dimensionally with respect to the vibrating plate 12 is used as the vibration output system 30, and the constricted portion 31 of the plate 11 allows an end of the vibrating plate 12 to be displaced in the in-plane direction. Thus, since a thick spring or the like is not used, the thickness of the actuator 10 is suitably reduced. In addition, since vibrations are output from the plate-like lever 32, the thickness of the actuator is also suitably reduced from this respect. Moreover, the thickness of the actuator 10 is suitably reduced in that the unimorph-type piezoelectric element 21 formed on the upper surface of the vibrating plate 12 is used as the exciting means 20.

As for the use of the thus constructed actuator 10, FIG. 9 shows an example in which the actuator 10 of this embodiment is used for a notification device 700, such as a pager and a mobile phone. In the notification device 700, a control section 730 is achieved by a ROM or the like storing therein a microcomputer and a program, and conducts control of the entire pager including notifying operation by the notification device 700.

In the notification device 700 of this embodiment, a notifying vibrating plate 51 as a follower member is connected to a lever 21 of the above-mentioned actuator 10. The notifying vibrating plate 51 receives an output of the lever 21 to vibrate, and as described hereinbelow, produces an audible sound and generates sensible vibrations instead of the audible sound depending on the vibration frequency thereof.

In the pager of this embodiment, when a receiving circuit 720 receives a calling signal, the control section 730 determines whether or not the calling signal is a signal to the pager. If agrees, the control section 730 first instructs the driving circuit 22 of the actuator 10 to output a driving signal for generating sensible vibrations (driving signal having a frequency corresponding to the resonance frequency of the vibration system). Accordingly, since the piezoelectric element 21 vibrates the vibrating plate 12 at a frequency corresponding to the driving signal for generating sensible vibrations, the output thereof is amplified through the lever 32 and then, transmitted to the notifying vibrating plate 51. Consequently, the notifying vibrating plate 51 vibrates at a frequency corresponding to the driving signal for generating sensible vibrations, and generates sensible vibrations. Therefore, a user is notified of the receipt of a message by the sensible vibrations, and the generation of the sensible vibrations is stopped when the user pushes a stop switch 750.

In contrast, when the control section 730 determines on the basis of monitored results of a timer 760 that the stop switch 750 is not pushed even if a predetermined time elapses after the notifying vibrating plate 51 has generated the sensible vibrations, the control section 730 instructs the driving circuit 22 to output a driving signal for producing an audible sound (driving signal having a frequency corresponding to a higher resonance frequency in the resonance frequencies of the vibration section) instead of the driving signal for generating the sensible vibrations. Accordingly, since the piezoelectric element 21 vibrates the vibrating plate 12 at a vibration frequency corresponding to the driving signal for producing the audible sound, the notifying vibrating plate 51 to which the output is transmitted also vibrates at a vibration frequency corresponding to the driving signal for producing the audible sound. Consequently, the user is notified of the receipt of a message by the audible sound, and the generation of the audible sound is stopped when the user pushes a stop switch 750.

In performing two types of notification as described above, in this embodiment, a common actuator 10 is used, and the vibrating plate used therein is vibrated at different frequencies. Accordingly, where it has been conventionally necessary to mount a sound producer and a vibration generator in a pager or the like, one unit of the notification device 700 of this embodiment can perform two types of notification. Therefore, there is provided an advantage that the pager can be reduced in size and weight. Moreover, since the actuator 10 occupies only a narrow space for bending vibrations of the vibrating plate 12 in the out-of-plane, the actuator 10 can be accommodated in a case of the pager even if the pager is reduced in thickness.

Incidentally, the notification device 700 is constructed such that the audible sound is automatically generated unless a switch operation for stopping the generation of sensible vibrations even if a fixed time elapses after the generation of sensible vibrations; however, the notification device may be constructed such that what type of notification to be performed may be selected by external operations according to the circumstances. Even when constructed as described above, one unit of the notification device 700 of this embodiment performs two types of notification, so that the pager can be reduced in size and weight.

While an example has been described in the above-mentioned embodiments in which an audible sound and sensible vibrations are generated by the actuator 10, the use of the actuator 10 is not restricted so long as it is used for a device which outputs vibrations of different frequencies from an actuator.

In addition, while an unimorph-type piezoelectric element is used as a piezoelectric element 21 in the above-mentioned embodiments, the piezoelectric element is not limited thereto and a bimorph-type piezoelectric element 21 may be used.

Further, while the vibrating plate is allowed to cause vibration forms shown in FIG. 8(A) and 8(B) as two types of vibration forms, the vibrating plate 11 may be allowed to cause longitudinal vibrations in the in-plane direction by being driven under a high frequency signal, and the vibrating plate 11 may be allowed to cause flexural vibrations in the out-of-plane direction by being driven under a low frequency signal so as to generate an audible sound and sensible vibrations.

SEVENTH EMBODIMENT

While the vibration output system is connected to one end portion of the vibrating plate and the other end portion is a stationary end, or another vibration output system is connected to the other end portion in all of the foregoing embodiments, the seventh, eighth, and ninth embodiments described hereinbelow are characterized in that a movable end to which a vibration output system 30 is connected is formed only at one end portion 125 of a vibrating plate 12, and the other end portion 126 is a free end.

FIGS. 10(A) and 10(B) are a plan view and a sectional view of a principal part of the actuator 10 according to the seventh embodiment of the present invention.

The actuator 10 shown in these drawings is roughly composed of a plate 11 having a thickness of about 0.5 mm secured and fixed by screws to a base (not shown), on which the actuator 10 is mounted, at two sections, a vibrating plate 12 having a thickness of about 0.05 mm which is arranged two-dimensionally with respect to the plate 11, and an exciting means 20 for allowing the vibrating plate 12 to cause longitudinal vibrations (shown by the arrow B in FIG. 10(B)).

In addition, in this embodiment, a vibration output system 30 is constructed which amplifies and outputs longitudinal vibrations of the vibrating plate 12 as vibrations in the in-plane direction utilizing the plate 11.

In this embodiment, a piezoelectric element 21 having a thickness of about 0.2 mm is formed on both surfaces of the vibrating plate 12. Accordingly, in the exciting means 20, a driving circuit 22 applies a driving signal having a frequency corresponding to a resonance frequency of a vibration system of the actuator 10 using each electrode (not shown) of the piezoelectric element 21 formed on both surfaces of the vibrating plate 12 and the vibrating plate 12 as both poles.

In addition, while one end portion 125 of the vibrating plate 12 is connected as a movable end to a vibration output system 30, the other end portion 126 is a complete free end.

In the vibration output system 30, the plate 11 is composed of a main body section 111 arranged in parallel with the vibrating plate 12 and secured to the above-mentioned base by screws at both ends thereof, and a lever 32 extending from a position located on the side of one end portion 125 of both ends of the main body section 111 that becomes a movable end of the vibrating plate 12 to the opposite side of the main body section 111 with respect to the vibrating plate 12. In addition, in the plate 11, a constricted portion 31 (elastic portion) is formed at a joint of the lever 32 and the main body section 111. Accordingly, the lever 32 has a structure such that a base end side 321 is connected to the constricted portion 31 and the movable end of the vibrating plate 12, and a leading end extends therefrom as a free end 322. For this reason, the lever 32 amplifies and outputs displacement of the connection between the movable end of the vibrating plate 12 and the lever 32 in the in-plane direction with a lever ratio corresponding to a ratio of a dimension from the constricted portion 31 to the connected position of the movable end of the vibrating plate 12 and the lever 32 to a dimension from the constricted portion 31 to the leading end (vibration output end) of the lever 32.

Further, in this embodiment, the vibrating plate 12 is formed into a sheet of plate 11. That is, in this embodiment, since a thin-walled portion formed on a plate-like member (plate 11) identical to the lever 32 is utilized as the vibrating plate 12, the number of components can be reduced. In addition, since the vibrating plate 12 is connected to the lever 32 so as to be located in the center of the thickness of the lever 32, the vibrating plate 12 and the lever 32 do not cause twisting or the like when displacement of the vibrating plate 12 in the in-plane direction is transmitted to the lever 32.

According to the thus constructed actuator 10, when a driving signal having a frequency corresponding to a resonance frequency of the vibration system is applied from the driving circuit 22 to the piezoelectric element 21 in the exciting means 20, the piezoelectric element 21 allows the vibrating plate 12 to cause longitudinal vibrations. Here, since the constricted portion 31 is formed between the main body section 111 of the plate 11 and the lever 32 despite a complete connection between the vibrating plate 12 and the base end side 321 of the lever 32, when the vibrating plate 12 vibrates longitudinally, one end portion 125, which should become the movable end of the vibrating plate 12, is elastically deformed at the constricted portion 31, thereby repeating displacement in the in-plane direction. Consequently, the lever 32 connected to one end portion 125 as the movable end at the base end side 321 thereof vibrates in the in-plane direction of the vibrating plate 12 at the free end 322 using the constricted portion 31 as a fulcrum, and transmits it to a ring-shaped follower member 500, as shown by the arrow C.

In the case where the thus constructed actuator 10 is used as a driving device for a ring-shaped date indicator 51 (follower member 500) of a calendar display mechanism 50 in a wristwatch similarly to the first embodiment, if the actuator 10 is actuated and the free end 322 of the lever 32 vibrates in the in-plane direction of the vibrating plate 12 about the constricted portion 31, the lever 32 repeatedly taps the inner periphery of the date indicator 51 in the direction shown by the arrow C, so that the effect similar to that of the first embodiment can be obtained such that the date indicator 51 is rotated in the direction shown by the arrow D to perform data advancement.

In addition, when the vibrating plate 12 and the lever 32 are formed on the same plate-like member (plate 11), since there is no junction by means of an adhesive or the like in a vibration transmission path from the vibrating plate 12 to the lever 32, vibration absorption does not occur. Accordingly, since the Q value of a piezoelectric vibrator is high, there is provided an advantage that vibration transmission efficiency from the vibrating plate 12 to the lever 32 is improved.

Further, in forming the vibrating plate 12 and the lever 32 on the same plate-like member (plate 11), the vibrating plate 12 is connected to the lever 12 so as to be located in substantially the center of the thickness of the lever 32. Therefore, the vibrating plate 12 and the lever 32 do not get twisted when displacement is transmitted from the vibrating plate 12 to the lever 32.

EIGHTH EMBODIMENT

FIGS. 11(A) and 11(B) are a plan view and a sectional view of a principal part of an actuator according to the eighth embodiment of the present invention. Incidentally, since the basic configuration of the actuator of this embodiment is similar to that of the seventh embodiment, the parts having similar functions are indicated by the same reference numerals in FIGS. 11(A) and 11(B), and a detailed description thereof will be omitted.

The actuator 10 shown in these drawings is, similarly to the third embodiment, composed of a plate 11 having a thickness of about 0.5 mm secured and fixed by screws to a base (not shown), on which the actuator 10 is mounted, at two sections, a vibrating plate 12 having a thickness of about 0.05 mm which is arranged two-dimensionally with respect to the plate 11, and an exciting means 20 for allowing the vibrating plate 12 to cause longitudinal vibrations (shown by the arrow B in FIG. 11(B)). In addition, in this embodiment, a vibration output system 30 is also constructed which amplifies and outputs longitudinal vibrations of the vibrating plate 12 as vibrations in an in-plane direction utilizing the plate 11.

In this embodiment, a piezoelectric element 21 having a thickness of about 0.2 mm is formed on both surfaces of the vibrating plate 12. Accordingly, in the exciting means 20, a driving circuit 22 applies a driving signal having a frequency corresponding to a resonance frequency of a vibration system of the actuator 10 using each electrode (not shown) of the piezoelectric element 21 formed on both surfaces of the vibrating plate 12 and the vibrating plate 12 as both poles.

In addition, while one end portion 125 of the vibrating plate 12 is connected as a movable end to a vibration output system 30, the other end portion 126 is a complete free end. Here, a weight 129 thicker than the vibrating plate 12 is fixed to the other end portion 126.

In the vibration output system 30, the plate 11 is composed of a main body section 111 arranged in parallel with the vibrating plate 12 and secured to the above-mentioned base by screws at both ends thereof, and a lever 32 extending from a position located on the side of one end portion 125 of both ends of the main body section 111 that becomes a movable end of the vibrating plate 12 to the opposite side of the main body section 111 with respect to the vibrating plate 12. In addition, in the plate 11, a constricted portion 31 is formed at a joint of the lever 32 and the main body section 111. Accordingly, the lever 32 has a structure such that a base end side 321 is connected to the constricted portion 31 and the movable end of the vibrating plate 12, and a leading end extends therefrom as a free end 322.

Further, the vibrating plate 12 is also formed into a sheet of plate 11 in this embodiment. That is, in this embodiment, since a thin-walled portion formed on a plate-like member (plate 11) identical to the lever 32 is utilized as the vibrating plate 12, the number of components can be reduced.

According to the thus constructed actuator 10, when a driving signal having a frequency corresponding to a resonance frequency of the vibration system is applied from the driving circuit 22 to the piezoelectric element 21 in the exciting means 20, the piezoelectric element 21 allows the vibrating plate 12 to cause longitudinal vibrations. Consequently, one end portion 125, which should become the movable end of the vibrating plate 12, is elastically deformed at the constricted portion 31, thereby repeating displacement in the in-plane direction of the vibrating plate 12, the lever 32 connected to one end portion 125 as the movable end at the base end side 321 thereof vibrates in the in-plane direction of the vibrating plate 12 at the free end 322 using the constricted portion 31 as a fulcrum, and transmits it to a follower member 500, as shown by the arrow C.

In the case where the thus constructed actuator 10 is used as a driving device of a calendar display mechanism 50 in a wristwatch similarly to the first embodiment, if the actuator 10 is actuated and the free end 322 of the lever 32 vibrates in the in-plane direction of the vibrating plate 12 about the constricted portion 31, the lever 32 repeatedly taps the inner periphery of a ring-shaped date indicator 51 in the direction shown by the arrow C, so that the effect similar to that of the first and third embodiments can be obtained such that the date indicator 51 is rotated in the direction shown by the arrow D to perform data advancement.

In addition, since the weight 129 is attached to the other end 126 as the free end of the vibrating plate 12, the vibrating plate 12 is not vibrated accidentally even if disturbance is applied thereto. Therefore, when the actuator 10 of this embodiment is used as the driving device of the calendar display mechanism 50 in the wristwatch, the date indicator 51 is not freely rotated, so that a malfunction, such as a shift of the date display, does not occur. In addition, if the weight 129 is attached to the other end portion 126 as the free end of the vibrating plate 12, the resonance frequency can be set to a low level, and the frequency can be adjusted by cutting the weight 129.

Further, in this embodiment, in forming the vibrating plate 12 and the lever 32 on the same plate-like member (plate 11), the vibrating plate 12 is also connected to the lever 12 so as to be located in substantially the center of the thickness of the lever 32. Therefore, the vibrating plate 12 and the lever 32 do not get twisted when displacement is transmitted from the vibrating plate 12 to the lever 32.

NINTH EMBODIMENT

FIGS. 12(A) and 12(B) are a plan view and a sectional view of a principal part of an actuator according to the ninth embodiment of the present invention. Incidentally, since the basic configuration of the actuator of this embodiment is similar to that of the seventh embodiment, the parts having similar functions are indicated by the same reference numerals in FIGS. 12(A) and 12(B), and a detailed description thereof will be omitted.

The actuator 10 shown in these drawings is, similarly to the third embodiment, composed of a plate 11 having a thickness of about 0.5 mm secured and fixed by screws to a base (not shown), on which the actuator 10 is mounted, at two sections, a vibrating plate 12 having a thickness of about 0.05 mm which is arranged two-dimensionally with respect to the plate 11, and an exciting means 20 for allowing the vibrating plate 12 to cause longitudinal vibrations (shown by the arrow B in FIG. 12(B)).

In addition, in this embodiment, a vibration output system 30 is also constructed which amplifies and outputs longitudinal vibrations of the vibrating plate 12 as vibrations in an in-plane direction utilizing the plate 11.

In this embodiment, a piezoelectric element 21 having a thickness of about 0.2 mm is formed on both surfaces of the vibrating plate 12. Accordingly, in the exciting means 20, a driving circuit 22 applies a driving signal having a frequency corresponding to a resonance frequency of a vibration system of the actuator 10 using each electrode (not shown) of the piezoelectric element 21 formed on both surfaces of the vibrating plate 12 and the vibrating plate 12 as both poles.

In addition, while one end portion 125 of the vibrating plate 12 is connected as a movable end to a vibration output system 30, the other end portion 126 is a complete free end.

In this embodiment, the vibrating plate 12 is constructed to be wide as compared with the third embodiment, and the width L1 is larger than the length L1.

In the vibration output system 30, the plate 11 is composed of a main body section 111 arranged in parallel with the vibrating plate 12 and secured to the above-mentioned base by screws at both ends thereof, and a lever 32 extending from a position located on the side of one end portion 125 of both ends of the main body section 111 that becomes a movable end of the vibrating plate 12 to the opposite side of the main body section 111 with respect to the vibrating plate 12. In addition, in the plate 11, a constricted portion 31 is formed at a joint of the lever 32 and the main body section 111. Accordingly, the lever 32 has a structure such that a base end side 321 is connected to the constricted portion 31 and the movable end of the vibrating plate 12, and a leading end extends therefrom as a free end 322.

Further, the vibrating plate 12 is also formed into a sheet of plate 11 in this embodiment. That is, in this embodiment, since a thin-walled portion formed on a plate-like member (plate 11) identical to the lever 32 is utilized as the vibrating plate 12, the number of components can be reduced.

According to the thus constructed actuator 10, when a driving signal having a frequency corresponding to a resonance frequency of the vibration system is applied from the driving circuit 22 to the piezoelectric element 21 in the exciting means 20, the piezoelectric element 21 allows the vibrating plate 12 to cause longitudinal vibrations. Consequently, one end portion 125, which should become the movable end of the vibrating plate 12, is elastically deformed at the constricted portion 31, thereby repeating displacement in the in-plane direction of the vibrating plate 12, the lever 32 connected to one end portion 125 as the movable end at the base end side 321 thereof vibrates in the in-plane direction of the vibrating plate 12 at the free end 322 using the constricted portion 31 as a fulcrum, and transmits it to a follower member 500, as shown by the arrow C.

In the case where the thus constructed actuator 10 is used as a driving device of a calendar display mechanism 50 in a wristwatch similarly to the first embodiment, if the actuator 10 is actuated and the free end 322 of the lever 32 vibrates in the in-plane direction of the vibrating plate 12 about the constricted portion 31, the lever 32 repeatedly taps the inner periphery of a ring-shaped date indicator 51 in the direction shown by the arrow C, so that the effect similar to that of the first and third embodiments can be obtained such that the date indicator 51 is rotated in the direction shown by the arrow D to perform data advancement.

In addition, since the vibrating plate 12 is formed to be wide, the longitudinal vibrations which can be controlled by the driving signal from the exciting means 20 are preferentially generated on the vibrating plate 12, so that flexural vibrations which cannot be controlled by the driving signal from the exciting means 20 are not generated. Therefore, when the actuator 10 of this embodiment is used as the driving device of the calendar display mechanism 50 in the wristwatch, the date indicator 51 is not rotated accidentally due to the uncontrollable flexural vibrations of the vibrating plate 12, so that a malfunction, such as a shift of the date display, does not occur.

In addition, from the viewpoint of controlling the form of vibrations, the width of the constricted portion 31 may be preferably formed narrower than the thickness of the plate-like member constituting this portion. This construction makes it difficult for the lever 32 to cause vibrations in the out-of-plane direction that are not required for driving the follower member such as the date indicator 51. Accordingly, the vibrations in the out-of-plane direction are not transmitted to the date indicator 51, and the vibrations in the in-plane direction can be transmitted to the date indicator 51 with efficiency.

Further, in this embodiment, in forming the vibrating plate 12 and the lever 32 on the same plate-like member (plate 11), the vibrating plate 12 is also connected to the lever 12 so as to be located in substantially the center of the thickness of the lever 32. Therefore, the vibrating plate 12 and the lever 32 do not get twisted when displacement is transmitted from the vibrating plate 12 to the lever 32.

TENTH EMBODIMENT

FIGS. 13(A) and 13(B) are a plan view and a sectional view of a principal part of an actuator according to the tenth embodiment of the present invention. Incidentally, since the basic configuration of the actuator of this embodiment is similar to that of the actuator according to the seventh embodiment, the parts having similar functions are indicated by the same reference numerals, and a detailed description thereof will be omitted.

The actuator 10 shown in these drawings is composed of an L-shaped flat plate 11 having a thickness of about 0.5 mm, a vibrating plate 12 having a thickness of about 0.05 mm which is arranged two-dimensionally with respect to the plate 11, and an exciting means 20 for allowing the vibrating plate 12 to cause longitudinal vibrations (shown by the arrow B in FIG. 13(B)).

In this embodiment, a piezoelectric element 21 having a thickness of about 0.2 mm is formed on both surfaces of the vibrating plate 12. Accordingly, in the exciting means 20, a driving circuit 22 applies a driving signal having a frequency corresponding to a resonance frequency of a vibration system of the actuator 10 using each electrode (not shown) of the piezoelectric element 21 formed on both surfaces of the vibrating plate 12 and the vibrating plate 12 as both poles.

In addition, while one end portion 125 of the vibrating plate 12 is connected as a movable end to a vibration output system 30, the other end portion 126 is a complete free end.

In this embodiment, a vibration output system 30 is also constructed which amplifies and outputs longitudinal vibrations of the vibrating plate 12 as vibrations in an in-plane direction utilizing the plate 11, as described hereinbelow. First, a through hole 116 is formed in a portion corresponding to a corner 115 of the L-shaped plate 11, and a shaft 171 rising from a base (not shown) is passed through the through hole 116. Here, since the through hole 116 has the diameter somewhat larger than that of the shaft 171, the plate 11 is in a rotatable state around the shaft 171. In this embodiment, a portion of the plate 11 perpendicular to the vibrating plate 12 is formed into a lever 32, and a constricted portion 31 (elastic portion) is formed at a joint of the lever 32. Accordingly, a base end side 321 of the lever 32 is connected to the constricted portion 31 and the movable end of the vibrating plate 12, and a leading end extends therefrom as a free end 322. In addition, a portion of the plate 11 parallel to the vibrating plate 12 is formed into a pressure spring 118, and the pressure spring 118 is integrally formed with the lever 32.

In the thus constructed plate 11, the shaft 171 rising from the base is passed through the through hole 116 formed in the portion corresponding to the corner 115, and the leading end of the pressure spring 118 is positioned by a fixed shaft 181 rising from the side of the base. On the other hand, a roller 60 of a decelerating mechanism described hereinbelow is arranged aside the free end 322 of the lever 32, and the roller 60 is in a state where it abuts against the side surface of the free end 322 of the lever 32 so as to rotate the plate 11 around the shaft 171, thereby pressing the pressure spring 118 to the fixed shaft 181. Conversely, the free end 322 of the lever 32 is pressed by the pressure spring 118 to the outer periphery of the roller 60. In this state, the free end 322 of the lever 32 is brought into elastically abutment with the outer peripheral surface of the roller 60 by an elastic force of the constricted portion 31.

In addition, referring to FIG. 13(B), a junction 117 of the lever 32 and the vibrating plate 12 is a thin-walled portion. Accordingly, since the vibrating plate 12 is connected to the lever 32 at a thin-walled portion of a plate-like member (plate 11) constituting the lever 32, the connected portion (overlaid portion) between the vibrating plate 12 and the lever 32 can be formed into a thin portion. In addition, since the vibrating plate 12 is connected to the lever 32 so as to be located in the center of the thickness of the lever 32, the vibrating plate 12 and the lever 32 do not cause twisting or the like when displacement of the vibrating plate 12 in the in-plane direction is transmitted to the lever 32.

Further, since the vibrating plate 12 is joined to the lever 32 at a narrow junction 117 of the lever 32, a joint area thereof is narrow. Accordingly, the displacement of the movable end of the vibrating plate 12 can be transmitted to the lever 32 with efficiency. Moreover, since the vibrating plate 12 and the lever 32 is supported by the base (not shown) via the elastic portion 31 and in a floated state, so that there is little loss of energy when vibrations are transmitted from the vibrating plate 12 to the lever 32.

Further, since the vibrating plate 12 and the lever 32 are connected at right angles, the displacement of the movable end of the vibrating plate 12 can be transmitted to the lever 32 with efficiency.

According to the thus constructed actuator 10, when a diving signal having a frequency corresponding to a resonance frequency of the vibration system is applied from the driving circuit 22 to the piezoelectric element 21 in the exciting means 20, the piezoelectric element 21 allows the vibrating plate 12 to cause longitudinal vibrations. Consequently, the displacement of the movable end (one end portion 125) of the vibration member 12 in the in-plane direction (shown by the arrow B in FIG. 13(B)) is transmitted to the lever 12. Consequently, the lever 12 generates resonant vibrations for bending the lever 12 in the in-plane direction using the connection between the vibrating member 12 and the lever 12 as node points as shown by a single-dot chain line LL1 in FIG. 13(A), so that the displacement of the movable end (one end portion 125) of the vibrating member 12 in the in-plane direction is amplified and output from the free end 322 of the lever 12. As a result, the free end 322 of the lever 12 repeatedly taps the outer peripheral surface of the roller 60, so that the roller 60 is rotated in the direction shown by the arrow D1.

An example in which the thus constructed actuator 10 is mounted in a calendar display device in a wristwatch will be described with reference to FIG. 14. FIG. 14 is a plan view showing a state where an actuator according to this embodiment is mounted in a calendar display device in a wristwatch.

A calendar display mechanism 50 shown in FIG. 14 has a Geneva structure comprising a displaying transmission wheel 52 which engages with both of a ring-shaped date indicator 51 (follower member) on which numerals for displaying the date are printed and a driving wheel 31 so as to transmit the rotation of the driving wheel 31 to the date indicator 51, and displays date utilizing a rotational driving force transmitted from the driving wheel 31. Since the date indicator 51 is ring-shaped having no rotating central shaft, in rotating this while positioning, in this embodiment, a guide mechanism (not shown) utilizing pins and dowels is constructed on the inner peripheral side or the outer peripheral side of the date indicator 51. The date indicator 51 has thirty one pieces of internal teeth 518 formed on the inner periphery thereof at intervals of the same angle. The displaying transmission wheel 52 has five pieces of projections formed on the outer periphery thereof at intervals of the same angle that are equivalent to external teeth 528. The driving wheel 31 has a structure such that a gear 311 having formed on the outer periphery thereof two recesses 313 meshing with the displaying transmission wheel 52, and a gear 312 having the diameter larger than that of the gear 311 are bonded.

Here, the displaying transmission wheel 52 is movable within the formation range of a hole 529; however, a first spring 581 abuts against a rotating central shaft 527 of the displaying transmission wheel 52, and the displaying transmission wheel 52 is in a state pressed between the driving wheel 31 and the date indicator 51. In addition, when the displaying transmission wheel 52 is to be ejected greatly from between the driving wheel 31 and the date indicator 51, a second spring 582 abuts against the rotating central shaft 527 of the displaying transmission wheel 52, so that the displaying transmission wheel 52 is not disengaged from between the driving wheel 31 and the date indicator 51.

In addition, the roller 60 described with reference to FIG. 13(A) is integrally formed with a gear 34 that meshes with the gear 312 of the driving wheel 31 via an intermediate gear 32. For this reason, when the roller 60 is rotated in the direction shown by the arrow D1, the rotational driving force is transmitted to the gear 311 of the driving wheel 31 via the gear 34, the intermediate gear 32, and the gear 312. Accordingly, every time the driving wheel 31 is rotated in the direction shown by the arrow D2 and the recesses 313 engages with the external teeth 528, the displaying transmission wheel 52 is rotated in the direction shown by the arrow D3. Consequently, the displaying transmission wheel 52 rotates the date indicator 51 in the direction (normal direction) shown by the arrow D4 to change the date display.

Incidentally, in this embodiment, there is constructed a display-correcting rapid advancing mechanism 9 for correcting the date display by rotating the date indicator 51 in rapid advancement without the aid of the driving wheel 31 and the displaying transmission wheel 52. The display-correcting rapid advancing mechanism 9 is composed of a winding stem (not shown) having a crown (not shown) fixed to the outer end portion thereof, a sliding pinion fixed to the winding stem, a first display-correcting transmission wheel 94 to which the rotation of the sliding pinion is transmitted, and a second display-correcting transmission wheel 96 which shifts to a position where it meshes with the date indicator 51 when the crown is pulled out to correct the calendar and the crown is rotated in the correction direction of the date display. Accordingly, when the crown is pulled out and the crown is rotated in the correction direction of the date display, the second display-correcting transmission wheel 96 shifts from the position shown by the solid line L12 to the position shown by the single-dot chain line L11 to mesh with the date indicator 51, so that the rotational action of the crown is transmitted as the rotation in the direction shown by the arrow D4 to the date indicator 51 via the first display-correcting transmission wheel 94, and the second display-correcting transmission wheel 96. Accordingly, it is possible to fast advance the date indicator 51 manually. However, in a state where the crown in pressed, the sliding pinion shifts from the engagement position with the first display-correcting wheel 94 and the engagement thereof is released, so that an excessive load is not applied to the driving wheel 31 and the displaying transmission wheel 52 when the date indicator 51 is allowed to perform a normal calendar advancement.

According to the thus constructed calendar display mechanism 50, since the lever 32 is included in the vibration system in the actuator 10, the resonance frequency is low. Thus, the actuator 10 is suitable for calendar advancement. In addition to this, since the actuator 10 actuates the date indicator 51 via the roller 60 and the decelerating mechanism 70 including a plurality of gears, sufficient torque can be transmitted to the date indicator 51, and there is less electric current to be dissipated.

In addition, since the actuator 10 actuates the date indicator 51 by a mechanism independent of a time-displaying movement, the actuator 10 can be incorporated into a timepiece of a model having different type of the time-displaying movement under the same specifications. Further, since both of the vibrating plate 12 and the lever 32 vibrate in the in-plane direction, the actuator 10 can be reduced in thickness. Therefore, there is provided an advantage that the actuator 10 can be overlaid on the time-displaying movement in the timepiece.

ELEVENTH EMBODIMENT

FIGS. 15(A) and 15(B) are a plan view and a sectional view of a principal part of an actuator according to the eleventh embodiment of the present invention. Incidentally, since the basic configuration of the actuator of this embodiment is similar to that of the actuator according to the tenth embodiment, the parts having common functions are indicated by the same reference numerals, and a detailed description thereof will be omitted.

An actuator 10 shown in FIGS. 15(A) and 15(B) may be used in the calendar display mechanism 50 shown in FIG. 14. Referring to FIGS. 15(A) and 15(B), the actuator 10 of this embodiment is composed of a U-shaped flat plate 11 having a thickness of about 0.5 mm, a vibrating plate 12 having a thickness of about 0.05 mm which is arranged two-dimensionally with respect to the plate 11, and an exciting means 20 for allowing the vibrating plate 12 to cause longitudinal vibrations (shown by the arrow B in FIG. 15(B)).

In this embodiment, a piezoelectric element 21 having a thickness of about 0.2 mm is formed on both surfaces of the vibrating plate 12. Accordingly, in the exciting means 20, a driving circuit 22 applies a driving signal having a frequency corresponding to a resonance frequency of a vibration system of the actuator 10 using each electrode (not shown) of the piezoelectric element 21 formed on both surfaces of the vibrating plate 12 and the vibrating plate 12 as both poles.

In addition, while one end portion 125 of the vibrating plate 12 is connected as a movable end to a vibration output system 30, the other end portion 126 is a complete free end.

In this embodiment, a vibration output system 30 is also constructed which amplifies and outputs longitudinal vibrations of the vibrating plate 12 as vibrations in an in-plane direction utilizing the plate 11, as described hereinbelow. First, a through hole 116 is formed in a portion corresponding to a corner 115 of the U-shaped plate 11, and a shaft 171 rising from a base (not shown) is passed through the through hole 116. Here, since the through hole 116 has the diameter somewhat larger than that of the shaft 171, the plate 11 is in a rotatable state around the shaft 171. In this embodiment, a portion of the U-shaped plate 11 perpendicular to the vibrating plate 12 is formed into a lever 32, and a constricted portion 31 (elastic portion) is formed at a joint of the lever 32. Accordingly, a base end side 321 of the lever 32 is connected to the constricted portion 31 and the movable end of the vibrating plate 12, and a leading end extends therefrom as a free end 322. In addition, a narrow portion of the plate 11 arranged in parallel with the lever 32 is formed into a pressure spring 118, and the pressure spring 118 is integrally formed with the lever 32.

In the thus constructed plate 11, the shaft 171 rising from the base is passed through the through hole 116 formed in the portion corresponding to the corner 115, and the leading end of the pressure spring 118 is positioned by a fixed shaft 181 rising from the side of the base. On the other hand, a roller 60 of a decelerating mechanism 70 (see FIG. 14) is arranged aside the free end 322 of the lever 32, and the roller 60 is in a state where it abuts against the side surface of the free end 322 of the lever 32 so as to rotate the plate 11 around the shaft 171, thereby pressing the pressure spring 118 to the fixed shaft 181. Accordingly, the free end 322 of the lever 32 is brought into elastically abutment with the outer peripheral surface of the roller 60 by an elastic force of the constricted portion 31.

In addition, referring to FIG. 15(B), an end portion of the vibrating plate 12 is bent at a junction of the lever 32 and the vibrating plate 12, and is joined in such a manner that its leading end portion 129 is overlaid on the upper surface of the lever 32. Accordingly, since the vibrating plate 12 is connected to the lever 32 so as to be located in the center of the thickness of the lever 32, both of the vibrating plate 12 and the lever 32 do not cause twisting or the like when the displacement of the vibrating plate 12 in the in-plane direction is transmitted to the lever 32. Moreover, since an end portion 128 of the vibrating plate 12 is diminished at the junction 117 of the lever 32 and the vibrating plate 12, a joint area of the vibrating plate and the lever 32 is narrow. Accordingly, the displacement of the movable end of the vibrating plate 12 can be transmitted to the lever 32 with efficiency. Further, since the vibrating plate 12 and the lever 32 are connected at right angles, the displacement of the movable end of the vibrating plate 12 can be transmitted to the lever 32 with efficiency.

According to the thus constructed actuator 10, when a diving signal having a frequency corresponding to a resonance frequency of the vibration system is applied from the driving circuit 22 to the piezoelectric element 21 in the exciting means 20, the piezoelectric element 21 also allows the vibrating plate 12 to cause longitudinal vibrations. Consequently, the displacement of the movable end (one end portion 125) of the vibration member 12 in the in-plane direction (shown by the arrow B in FIG. 15(B)) is transmitted to the lever 12. Consequently, the lever 12 generates resonant vibrations for bending the lever 12 in the in-plane direction using the connection between the vibrating member 12 and the lever 12 as node points as shown by a single-dot chain line LL1 in FIG. 15(A), so that the displacement of the movable end (one end portion 125) of the vibrating member 12 in the in-plane direction is amplified and output from the free end 322 of the lever 12. As a result, the free end 322 of the lever 12 repeatedly taps the outer peripheral surface of the roller 60, so that the roller 60 is rotated in the direction shown by the arrow D1.

TWELFTH EMBODIMENT

FIG. 16(A) is a plan view of an actuator according to the twelfth embodiment of the present invention. Incidentally, since the basic configuration of the actuator of this embodiment is similar to that of the actuator according to the tenth and eleventh embodiments, the parts having common functions are indicated by the same reference numerals, and a detailed description thereof will be omitted.

In an actuator 10 shown in FIG. 16(A), when the longitudinal vibrations (shown by the arrow B in FIG. 16(B)) of the vibrating plate 12 are transmitted to the lever 12 as in the tenth and the eleventh embodiments, and the lever 12 generates resonant vibrations for bending the lever 12 in the in-plane direction using the connection between the vibrating member 12 and the lever 12 as node points as shown by a single-dot chain line LL1, it is preferable that a projection 329 is formed on the lever 32 at the position between node points, and the projection 329 abuts against a follower member or a roller 60 of a decelerating mechanism 70.

In the thus constructed actuator 10, when an exciting means (not shown) allows the vibrating plate 12 to cause first vibrations at a resonance frequency of a vibration system including the vibrating plate, and second vibrations at a frequency corresponding to a higher resonance frequency of the resonance frequency, as the state of the respective vibrations are shown by the single-dot chain lines LL1 and LL2 in FIGS. 16(A) and 16(B), resonant vibrations for bending the lever 32 in the in-plane direction by different degrees are generated. Consequently, the projection 329 of the lever 32 vibrates in different directions to tap the roller 60 in different directions. Accordingly, by merely changing the degrees of the resonant vibrations generated by the lever 32, the rotation direction of the roller 60 can be reversed, as shown by the arrows D11 and D12.

OTHER EMBODIMENTS

While the date indictor 51 of the calendar display mechanism 50 in the wristwatch is rotated by the actuator 10 of the present invention in all of the above-mentioned embodiments, a day indicator may be rotated by the actuator 10. In addition, the actuator 10 to which the present invention is applied can be utilized not only as the calendar mechanism in the wristwatch, but also as a driving device for apparatuses displaying a time, a month, a year, the age of the moon, the position of the sun and further, the depth of water, barometric pressure, temperature, humidity, direction, velocity and so forth. Further, it is a matter of course that the actuator 10 can be utilized as driving devices of various types of apparatuses except a displaying apparatus. Still further, the actuator according to the present invention is not limited to the use in which the follower member is a ring-shaped calendar displaying wheel, and the actuator can be utilized for a linearly reciprocating actuator, and a vibration-generating actuator.

In addition, while the unimorph-type piezoelectric element is used as the piezoelectric element 21, a bimorph-type piezoelectric element 21 may be used according to a vibration form.

Further, in the case where a piezoelectric 21 stacked on a vibrating plate 11 is used as an exciting means for the vibrating plate 11, when a lever 11 (vibration output system) is vibrated by disturbance and the vibration is transmitted to the vibrating plate 11, a electromotive force is generated on the piezoelectric element 21. Accordingly, if an electromotive force-detecting circuit (disturbance monitoring means) is formed, whether or not the disturbance is applied to the lever 11 can be monitored. In addition, an output circuit for outputting an electromotive force generated on the piezoelectric element 21 when the lever 11 is vibrated by disturbance and the vibration is transmitted to the vibrating plate 12 may be provided so as to be utilized as a power generating device.

Still further, as shown in FIG. 17(A), a stacked piezoelectric element 21 may be used in which a piezoelectric material and electrodes are stacked in the in-plane direction. Further, any type of exciting means 20 may be used so long as a means for allowing the vibrating plate 12 to cause bending vibrations in the out-of-plane direction, such as a means including a magnetic member 23, such as a permanent magnet or a movable iron piece formed on the side of the vibrating plate 12, an electromagnet 24 opposing the magnetic member, and a driving circuit for the electromagnet 24. In any of these embodiments, if the exciting means 20 vibrates one vibrating plate 12 at different frequencies, the lever 32 drives the follower member with vibrations at different frequencies. In addition, in a notification device, both of an audible sound and sensible vibrations can be generated using one actuator.

INDUSTRIAL APPLICABILITY

As described above, in the actuator according to the present invention, when the exciting means drives the vibrating plate, the movable end of the vibrating plate is displaced in the in-plane direction. Thus, the vibration output system amplifies and outputs the displacement as vibration in the in-plane direction. Accordingly, the actuator of the present invention is of a new type which takes out vibrations of the vibrating plate as vibrations in the in-plane direction, and has advantages that the actuator can be constructed using few components, and can be constructed within a space across the thickness where the vibrating plate generates vibrations in the out-of-plane direction.

What is claimed is:

1. An actuator comprising: a vibrating plate having at least one moveable end portion adapted to be displaced by vibrations in an in-plane direction and to transmit the displacement; an exciting means for stimulating said vibrating plate to cause vibrations; and a vibration output system connected to said at least one movable end portion so as to amplify and output displacement of said at least one movable end portion in an in-plane direction as vibration in the in-plane direction, wherein the vibration displacement of said vibration output system and said at least one movable end portion in the in-plane direction is associated with longitudinal vibrations of said vibrating plate or with flexural vibrations of said vibrating plate in an out-of-plane direction.

2. An actuator according to claim 1, wherein said at least one moveable end portion comprises one moveable end and said vibrating plate further includes a second stationary end portion, and wherein said vibration output system is connected to said vibrating plate only at said one moveable end portion.

3. An actuator according to claim 1, wherein said exciting means includes a piezoelectric element formed on at least one surface of said vibrating plate; and a driving circuit for said piezoelectric element.

4. An actuator according to claim 1, wherein said vibration output system includes a lever having a base end connected to said at least one movable end portion of said vibrating plate and having a leading end that is a free end constituting a vibration output end; and an elastic portion for supporting the base end of said lever.

5. An actuator according to claim 4, wherein said lever is a plate-like lever arranged two-dimensionally with respect to said vibrating plate.

6. An actuator according to claim 4, wherein said lever amplifies and outputs displacement of said at least one movable end portion of said vibrating plate in the in-plane direction with a lever ratio corresponding to a ratio of a dimension from said elastic portion to the connection between said at least one movable end portion of said vibrating plate and said lever to a dimension from said elastic portion to the vibration output end of said lever.

7. An actuator according to claim 4, wherein said lever generates resonance vibrations for bending said lever in the in-plane direction of said lever, thereby amplifying and outputting the displacement of said at least one movable end portion of said vibrating plate in the in-plane direction.

8. An actuator according to claim 5, wherein said vibrating plate is joined to a thin-walled portion of the plate-like member constituting said lever.

9. An actuator according to claim 4, wherein said vibrating plate is connected to said lever so as to be located substantially in the center of the thickness of said lever.

10. An actuator according to claim 4, wherein said vibrating plate is connected to said lever so as to be substantially perpendicular to said lever.

11. An actuator according to claim 4, wherein said vibration output system is constructed so as to transmit vibrations to the periphery of a sheet-like follower ring substantially coplanar with said vibrating plate, thereby rotationally driving the follower ring circumferentially.

12. An actuator according to claim 11, wherein said follower ring is arranged around said vibration output system and said vibrating plate, and
wherein said vibration output system is constructed so as to transmit vibrations to the inner periphery of said follower ring, thereby rotationally driving said follower ring circumferentially.

13. An actuator according to claim 11, wherein said vibration output system includes a projection on the vibration output end of said lever abutting against the periphery of said follower ring.

14. An actuator according to claim 11, wherein said vibration output system is constructed so as to rotationally drive said follower ring via a decelerating mechanism.

15. An actuator according to claim 1, wherein said exciting means is constructed so as to stimulate said vibrating plate to first vibrations having a first vibration frequency and second vibrations having a second frequency different from the first frequency.

16. An actuator according to claim 15, wherein said exciting means is constructed so as to stimulate said vibrating plate to cause said first vibrations at the first vibration frequency comprising a first resonance frequency of the vibration system including said vibrating plate, and said second vibrations at the second vibration frequency corresponding to a higher resonance frequency than said first resonance frequency.

17. A timepiece employing an actuator according to claim 1 as a driving device of a calendar display mechanism.

18. A timepiece employing an actuator according to claim 11 as a driving device of a calendar display mechanism, wherein said calendar display mechanism includes a ring-shaped calendar display wheel as said follower ring.

19. A notification device employing an actuator according to claim 15, wherein notification is effected by at least said first vibrations.

20. An actuator comprising: a vibrating plate having at least one moveable end portion adapted to be displaced by vibrations in an in-plane direction and to transmit the displacement; an exciting means for stimulating said vibrating plate to cause vibrations; and a vibration output system connected to said at least one movable end portion so as to amplify and output displacement of said at least one movable end portion in an in-plane direction as vibration in the in-plane direction, wherein said at least one movable end portion comprises two moveable end portions, and wherein said vibration output system comprises a first vibration output system connected to one moveable end portion and a second vibration output system connected to the other moveable end portion.

21. A timepiece employing an actuator according to claim 20 as a driving device of a calendar display mechanism, wherein said calendar display mechanism includes a ring-shaped calendar display wheel receiving vibrations from said first and second vibration output systems on the periphery of the calendar display mechanism to rotate, and wherein said calendar display wheel includes a plurality of notches formed on the periphery thereof in such a manner that when the vibration output end of one of said first and second vibration output systems is located within a notch during downtime of said actuator, the vibration output end of the other vibration output system is located out of the notch.

22. An actuator comprising: a vibrating plate having at least one moveable end portion adapted to be displaced by vibrations in an in-plane direction and to transmit the displacement; an exciting means for stimulating said vibrating plate to cause vibrations; and a vibration output system connected to said at least one movable end portion so as to amplify and output displacement of said at least one movable end portion in an in-plane direction as vibration in the in-plane direction, wherein said at least one moveable end portion comprises one moveable end portion and said vibrating plate further includes a second free end, and wherein said vibration output system is connected to said vibrating plate only at said one moveable end portion.

23. An actuator according to claim 22, wherein said vibrating plate includes a weight at the second free end.

24. An actuator according to claim 22, wherein said vibrating plate has a length longer than a width.

25. An actuator comprising: a vibrating plate having at least one moveable end portion adapted to be displaced by vibrations in an in-plane direction and to transmit the displacement; an exciting means for stimulating said vibrating plate to cause vibrations; and a vibration output system connected to said at least one movable end portion so as to amplify and output displacement of said at least one movable end portion in an in-plane direction as vibration in the in-plane direction, wherein said exciting means includes a piezoelectric element formed on at least one surface of said vibrating plate; and a driving circuit for said piezoelectric element, said actuator further comprising a disturbance-monitoring means for detecting vibrations of said vibration output system caused by disturbance by an electromotive force generated in said piezoelectric element when said vibrating plate is vibrated by the vibrations.

26. An actuator comprising: a vibrating plate having at least one moveable end portion adapted to be displaced by vibrations in an in-plane direction and to transmit the displacement; an exciting means for stimulating said vibrating plate to cause vibrations; and a vibration output system connected to said at least one movable end portion so as to amplify and output displacement of said at least one movable end portion in an in-plane direction as vibration in the in-plane direction, wherein said exciting means includes a piezoelectric element formed on at least one surface of said vibrating plate; and a driving circuit for said piezoelectric element, said actuator further comprising an output circuit for outputting an electromotive force generated in said piezoelectric element when said vibration output system is vibrated by disturbance and the vibration is transmitted to said vibrating plate.

27. An actuator comprising: a vibrating plate having at least one moveable end portion adapted to be displaced by vibrations in an in-plane direction and to transmit the displacement; an exciting means for stimulating said vibrating plate to cause vibrations; and a vibration output system connected to said at least one movable end portion so as to amplify and output displacement of said at least one movable end portion in an in-plane direction as vibration in the in-plane direction, wherein the vibration displacement of said vibration output system and said at least one movable end portion in the in-plane direction is associated with flexural vibrations of said vibrating plate in an out-of-plane direction, and wherein said exciting means includes a magnetic member formed on said vibrating plate; an electromagnet opposing said magnetic member; and a driving circuit for said electromagnet.

28. An actuator comprising: a vibrating plate having at least one moveable end portion adapted to be displaced by vibrations in an in-plane direction and to transmit the displacement; an exciting means for stimulating said vibrating plate to cause vibrations; and a vibration output system connected to said at least one movable end portion so as to amplify and output displacement of said at least one movable end portion in an in-plane direction as vibration in the in-plane direction, wherein said vibration output system includes a lever having a base end connected to said at least one movable end portion of said vibrating plate and having a leading end that is a free end constituting a vibration output end; and an elastic portion for supporting the base end of said lever, wherein said at least one moveable end portion comprises at least one moveable end portion and said vibrating plate further includes a second free end portion, wherein said lever is connected to said vibrating plate only at said one moveable end portion, and wherein said vibrating plate and said lever are supported only by said elastic portion.

29. An actuator according to claim 28, further comprising a pressure spring for pressing the vibration output end of said lever to a follower member.

30. An actuator according to claim 29, wherein said pressure spring and said lever are integrally formed with a plate-like member.

31. An actuator according to claim 30, wherein said plate-like member is supported between said pressure spring and said lever in a rotatable state within a plane, and an end portion of said pressure spring is positioned, whereby the vibration output end of said lever is pressed by said pressure spring toward said follower member.

32. An actuator according to claim 29, wherein the vibration output end of said lever is elastically in contact with said follower member by an elastic force of said elastic portion.

33. An actuator according to claim 30, wherein said elastic portion is formed as a constricted portion of said plate-like member arranged two-dimensionally with respect to said vibrating plate.

34. An actuator according to claim 33, wherein the width of said constricted portion is narrower than the thickness of said plate-like member.

35. An actuator according to claim 30, wherein said vibrating plate is a thin-walled portion formed on the plate-like member with which said lever is integrally formed.

36. An actuator comprising: a vibrating plate having at least one moveable end portion adapted to be displaced by vibrations in an in-plane direction and to transmit the displacement; an exciting means for stimulating said vibrating plate to cause vibrations; and a vibration output system connected to said at least one movable end portion so as to amplify and output displacement of said at least one movable end portion in an in-plane direction as vibration in the in-plane direction, wherein said vibration output system includes a lever having a base end connected to said at least one movable end portion of said vibrating plate and having a leading end that is a free end constituting a vibration output end; and an elastic portion for supporting the base end of said lever, wherein said vibration output system is constructed so as to transmit vibrations to the periphery of a sheet-like follower ring substantially coplanar with said vibrating plate, thereby rotationally driving the follower ring circumferentially, wherein said vibration output system is constructed so as to rotationally drive said follower ring via a decelerating mechanism, and wherein said decelerating mechanism includes a roller against which the vibration output end of said vibration output system abuts.

37. An actuator according to claim 36, wherein said vibration output system includes a projection formed on the vibration output end abutting against said roller.

38. An actuator comprising: a vibrating plate having at least one moveable end portion adapted to be displaced by vibrations in an in-plane direction and to transmit the displacement; an exciting means for stimulating said vibrating plate to cause vibrations; and a vibration output system connected to said at least one movable end portion so as to amplify and output displacement of said at least one movable end portion in an in-plane direction as vibration in the in-plane direction, wherein said vibration output system includes a lever having a base end connected to said at least one movable end portion of said vibrating plate and having a leading end that is a free end constituting a vibration output end; and an elastic portion for supporting the base end of said lever, wherein said exciting means is constructed so as to cause said vibrating plate to generate first vibrations at a first resonance frequency of the vibration system including said vibrating plate, and second vibrations at a second resonance frequency corresponding to a higher resonance frequency than said first resonance frequency and wherein said vibrating plate causes the lever used in said vibration output system to cause resonant vibrations for bending said lever by different degrees in the in-plane direction of said lever.

39. An actuator according to claim 38, wherein said lever includes a projection abutting against the follower member at a position between nodes in generating said resonant vibrations.

40. A notification device employing an actuator comprising: a vibrating plate having at least one moveable end portion adapted to be displaced by vibrations in an in-plane direction and to transmit the displacement; an exciting means for stimulating said vibrating plate to cause vibrations; and a vibration output system connected to said at least one movable end portion so as to amplify and output displacement of said at least one movable end portion in an in-plane direction as vibration in the in-plane direction, wherein said exciting means is constructed so as to stimulate said vibrating plate to first vibrations having a first vibration frequency and second vibrations having a second frequency different from the first frequency, and wherein sensible vibrations are generated by said first vibrations, and an audible sound is produced by said second vibrations.

* * * * *